US008464177B2

(12) United States Patent
Ben-Yoseph et al.

(10) Patent No.: US 8,464,177 B2
(45) Date of Patent: Jun. 11, 2013

(54) WINDOW RESIZING IN A GRAPHICAL USER INTERFACE

(76) Inventors: Roy Ben-Yoseph, Ashburn, VA (US); Iain Fraser Langridge, McLean, VA (US); Cian Chang, Sterling, VA (US)

( * ) Notice: Subject to any disclaimer, the term of this patent is extended or adjusted under 35 U.S.C. 154(b) by 987 days.

(21) Appl. No.: 11/747,819

(22) Filed: May 11, 2007
(Under 37 CFR 1.47)

(65) Prior Publication Data
US 2008/0052637 A1 Feb. 28, 2008

Related U.S. Application Data

(60) Provisional application No. 60/820,462, filed on Jul. 26, 2006.

(51) Int. Cl.
G06F 3/048 (2006.01)
(52) U.S. Cl.
USPC ............................ 715/800; 715/797; 715/792
(58) Field of Classification Search
USPC ......................................... 715/792, 800, 797
See application file for complete search history.

(56) References Cited

U.S. PATENT DOCUMENTS

| 7,391,423 | B1* | 6/2008 | Manzari et al. ............... 345/619 |
| 2003/0182628 | A1* | 9/2003 | Lira .............................. 715/517 |
| 2004/0179038 | A1* | 9/2004 | Blattner et al. ............... 345/751 |
| 2004/0216056 | A1* | 10/2004 | Tootill .......................... 715/786 |
| 2005/0235220 | A1* | 10/2005 | Duperrouzel et al. ........ 715/788 |
| 2006/0248471 | A1* | 11/2006 | Lindsay et al. ............... 715/800 |
| 2007/0136685 | A1* | 6/2007 | Bhatla et al. .................. 715/800 |
| 2007/0157119 | A1* | 7/2007 | Bishop .......................... 715/810 |
| 2008/0082604 | A1* | 4/2008 | Mansour et al. ............. 709/203 |

* cited by examiner

Primary Examiner — Andrea Leggett
(74) Attorney, Agent, or Firm — Finnegan, Henderson, Farabow, Garrett & Dunner LLP

(57) ABSTRACT

Replacing display content in a window of a graphical user interface includes displaying a window in a graphical user interface, and displaying first display content in the window. A request initiated by a user to change a size of the window is received. Second display content is accessed based on the request. The second display content is different from the first display content. In response to the request, the window is resized and the second display content is substituted for the first display content in the resized window.

34 Claims, 29 Drawing Sheets

ACTIVE (MAXIMIZED)

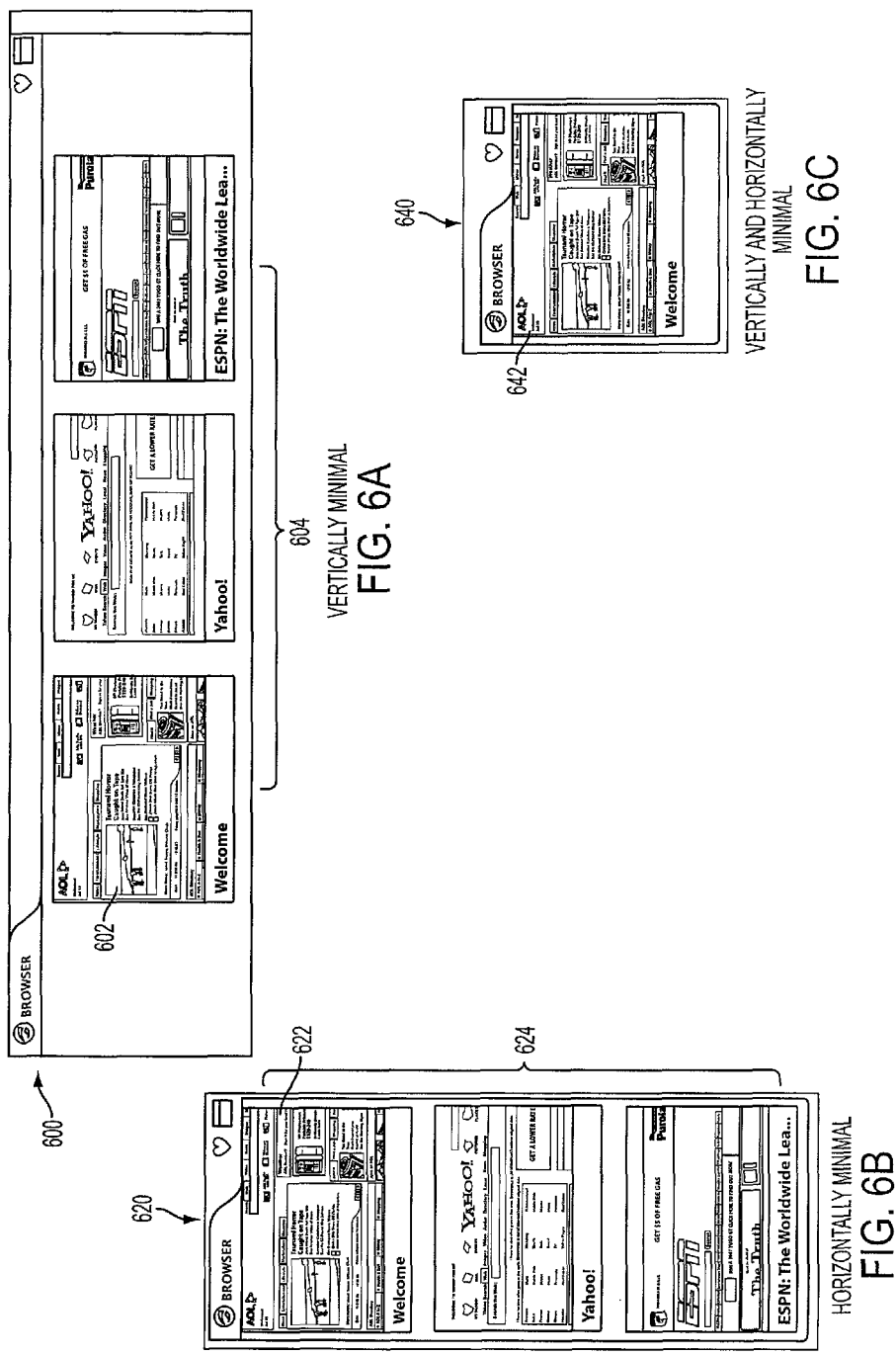

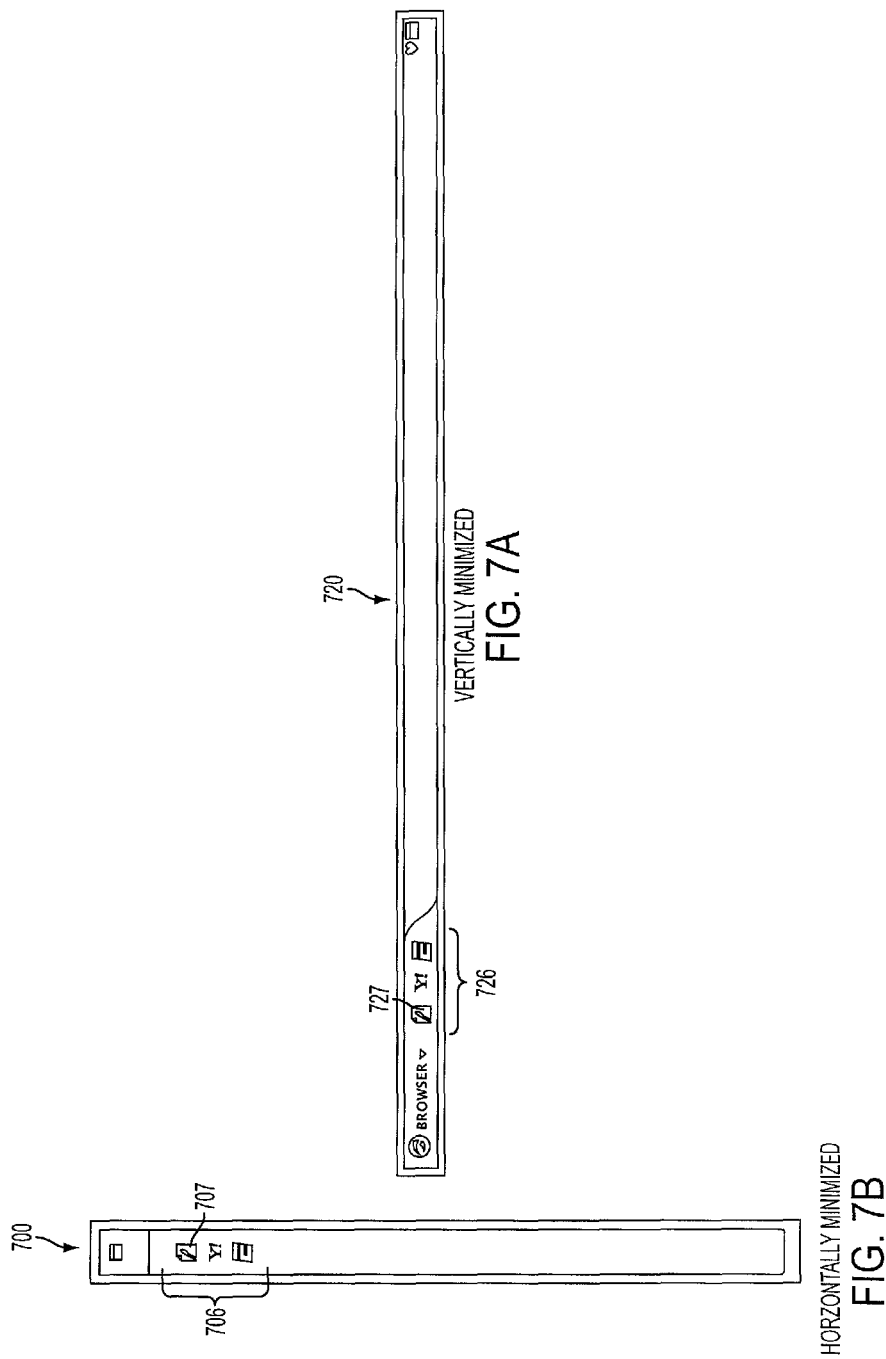

HORIZONTALLY MINIMIZED

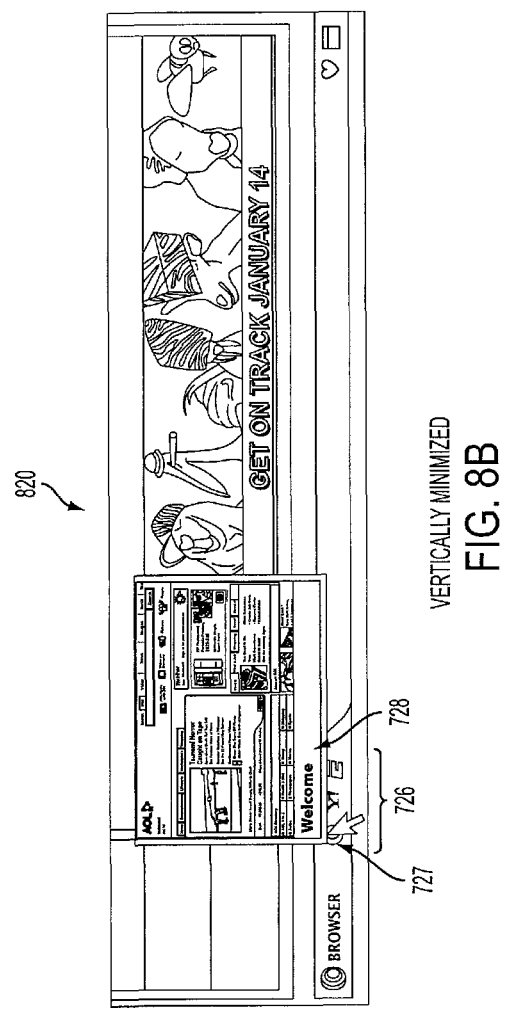

ACTIVE (MAXIMIZED)

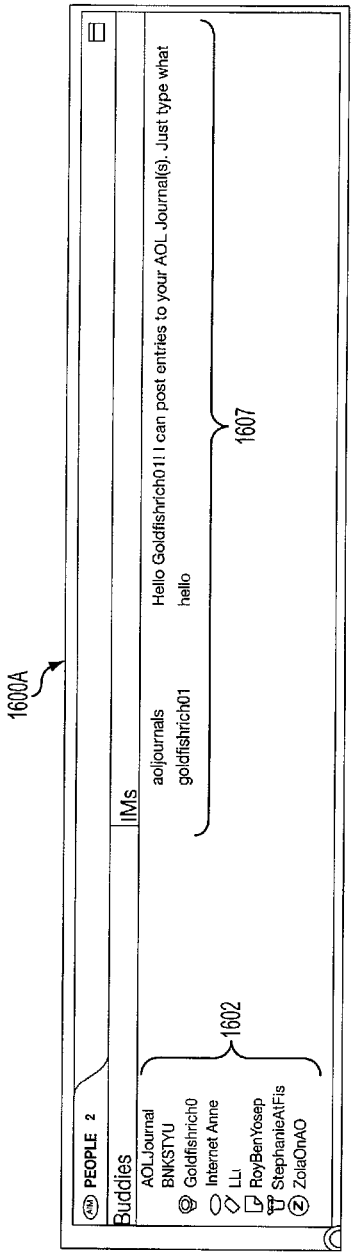
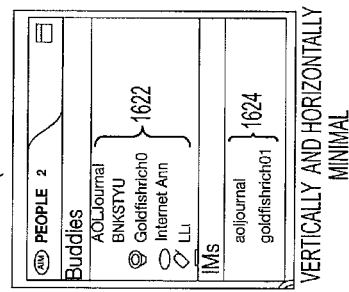
FIG. 16A VERTICALLY MINIMAL
FIG. 16B VERTICALLY AND HORIZONTALLY MINIMAL

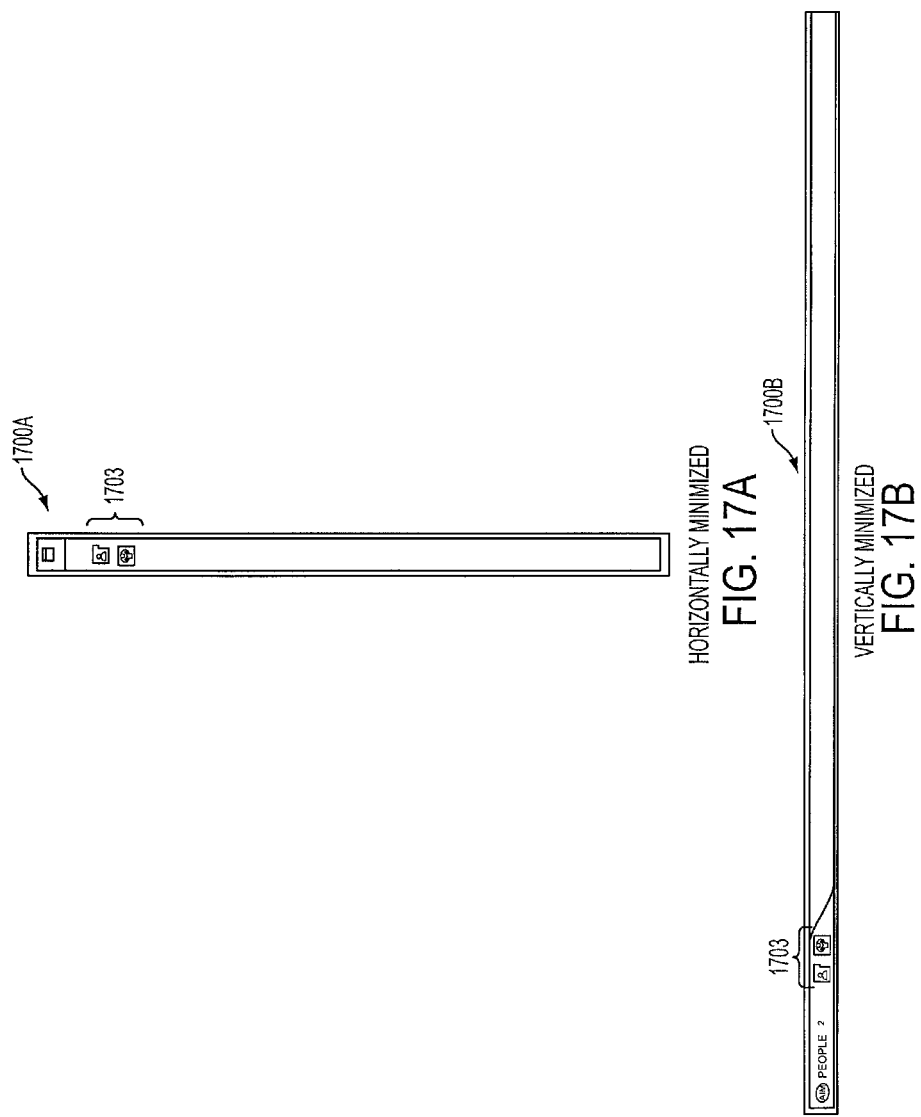

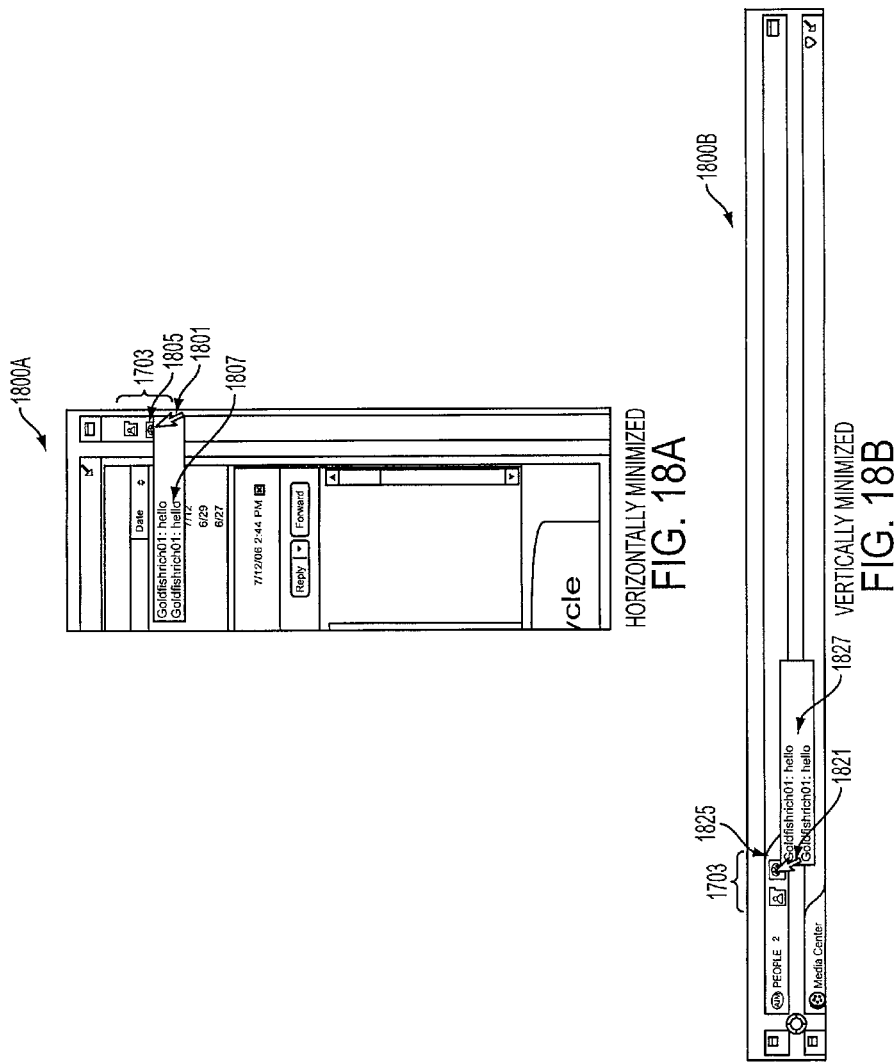

WINDOW RESIZING IN A GRAPHICAL USER INTERFACE

CROSS REFERENCE TO RELATED APPLICATION

The application claims priority to Provisional U.S. Patent Application No. 60/820,462, filed Jul. 26, 2006, and titled Window Resizing in a Graphical User Interface, which is incorporated by reference in its entirety for all purposes.

TECHNICAL FIELD

This disclosure relates to graphical user interface window sizing.

BACKGROUND

Graphical user interfaces (GUIs) for computers can contain numerous windows. A window is a rectangular graphical user interface element that displays electronic content to a user. Multiple windows may be displayed concurrently in a single graphical user interface. GUIs enable a user to manually set the dimensions and position of each window by moving a mouse and clicking appropriate buttons on the mouse. Manual reduction of the dimensions of a window can truncate the displayed content such that only a portion of the previously displayed content is visible to the user subsequent to the reduction in the window's size. A window that has been reduced in size, however, can still allow a user to view all of the previously displayed content, despite its smaller dimensions, by having scroll bars with which the user may interact to "scroll" through the previously displayed content.

DESCRIPTION OF DRAWINGS

FIGS. 6A-6C are illustrations of a browser user interface window displayed in various minimal states.

FIGS. 7A-7B are illustrations of browser user interface windows displayed in various minimized states.

FIGS. 8A-8B are illustrations of browser user interface windows displayed in various minimized states.

FIGS. 16A-16B are illustrations of people user interface windows displayed in various minimal states.

FIGS. 17A-17B are illustrations of people user interface windows displayed in various minimized states.

FIGS. 18A-18B are illustrations of people user interface windows displayed in various minimized states.

DETAILED DESCRIPTION

Figure 1:
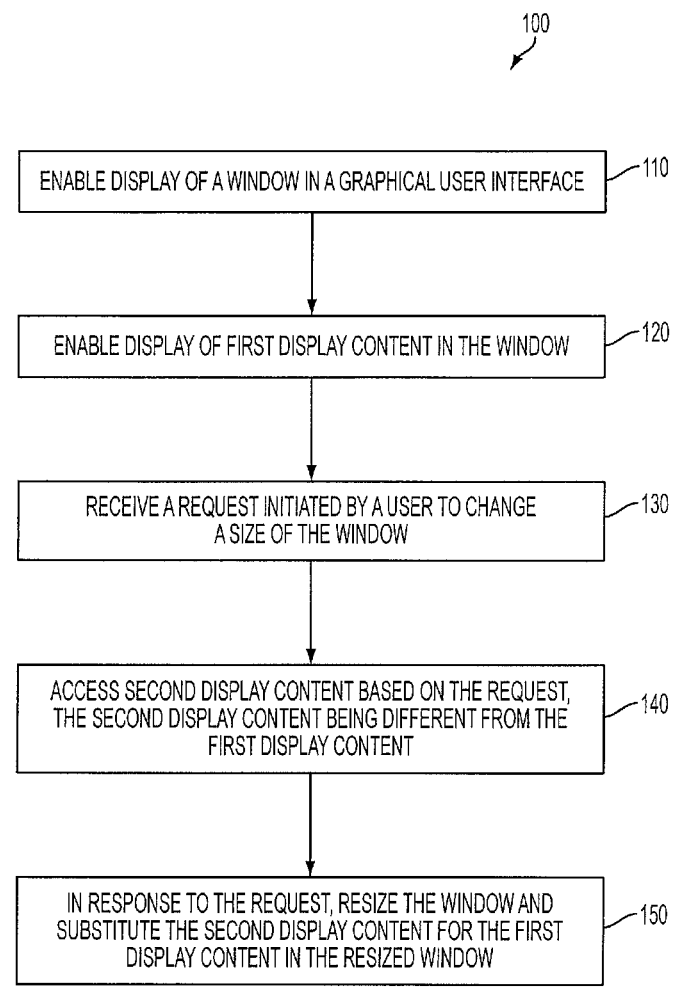
FIG. 1 is a flow chart of an exemplary process by which display content is replaced in a window of a graphical user interface in response to a change in the size of the window.

In one particular implementation, a client system includes a GUI having a window selectable by a user of the client system. The window displays electronic content (hereinafter referred to as "display content"). The display content includes graphical elements, such as text, video, and/or pictures, and, optionally, may include white space displayed between the graphical elements and/or between the graphical elements and a border of the window. The display content of a window is distinct from the border or header of the window and is instead the content found within the border of the window that is referenced or described by the header. The user manually resizes the horizontal and vertical dimensions of the window. When the resizing decreases the dimensions of the window, the GUI is adjusted in response to the manual resizing by removing white space and/or adding/updating scrollbars to the window as necessary to accommodate the displayed content in the newly resized window. However, once the dimensions of the window are decreased passed a predetermined threshold dimension, the GUI is adjusted in response to the resizing by replacing the display content with new display content rather than or in addition to continuing to remove white space and/or updating the scrollbars. The new display content is related to the previous display content but is better able to be accommodated in the smaller window.

For example, the window may be an Internet browser window that displays a web page. The user may manually resize the window to decrease its horizontal and/or vertical dimensions. As the horizontal and/or vertical dimensions are decreased by the user, white space is removed from the displayed web page and the displayed web page is truncated if necessary (i.e., if the window prior to being resized displays an entire web page, a portion of the web page rather than the entire web page is displayed in the resized window, or, alternatively, if the window prior to being resized displays a portion of a web page, a smaller portion of the web page is displayed in the resized window). Scroll bars may be added to the window and/or updated to enable the user to view the complete web page in the smaller window through interaction with the scroll bars. However, once the vertical and/or horizontal dimension of the window is decreased past a predetermined vertical and/or horizontal threshold dimension, the displayed web page is replaced by a thumbnail of the web page. In this manner, the GUI intelligently responds to the resizing of the window to enable the user to continue to perceive useful content in the window despite the window having been resized to such a degree that, absent such intelligent content substitution, substantial truncating of the content displayed in the window would have significantly compromised its usefulness to the user.

Accordingly, the above example contemplates a window having two states depending on its dimensions—(1) a first state corresponding to the window displaying all or a portion of the web page; and (2) a second state corresponding to the window displaying a thumbnail corresponding to the web page (e.g., representing or acting as a surrogate for, or substituting for). The window transitions from the first state to the second state and vice-versa in response to the user resizing the window's vertical and/or horizontal dimensions passed a vertical and/or a horizontal threshold dimension.

As described in more detail below, other implementations are contemplated. For example, the window may have more than two states, and the window may be resized progressively and simultaneously with other windows in response to a user manually dragging or repositioning a user interface element from one location in a GUI display to another location in the display.

Process 100 of FIG. 1 illustrates an exemplary process for replacing display content in a window of a GUI in response to a request initiated by a user to change the size of the window. A window is displayed in a GUI (110). A first display content is displayed in the window (120). For example, depending on the initial size of the window, the first display content may be a web page or a thumbnail of the web page. A request initiated by a user is received to change the size of the window (130). A second display content that is different from the first display content is accessed based on the request (140). In response to the request, the window is resized and the second display content is substituted for the first display content in the sized window (150). For example, if the window that is being resized is displaying a web page and a request initiated by the user changes the size of the window such that the window's vertical and/or horizontal dimensions fall below a predetermined vertical and/or horizontal dimension, a thumbnail of the web page is substituted for the web page for display in the resized window. Alternatively, if the window that is being resized is displaying a thumbnail associated with a web page and a request initiated by the user changes the size of the window such that the window's vertical and/or horizontal dimensions rise above a predetermined vertical and/or horizontal dimension, the web page is substituted for the thumbnail of the web page for display in the resized window. Notably, the first and second display contents are related to each other. In this particular example, the thumbnail may be a miniaturized version of the web page or of a portion of the web page.

Figure 2:
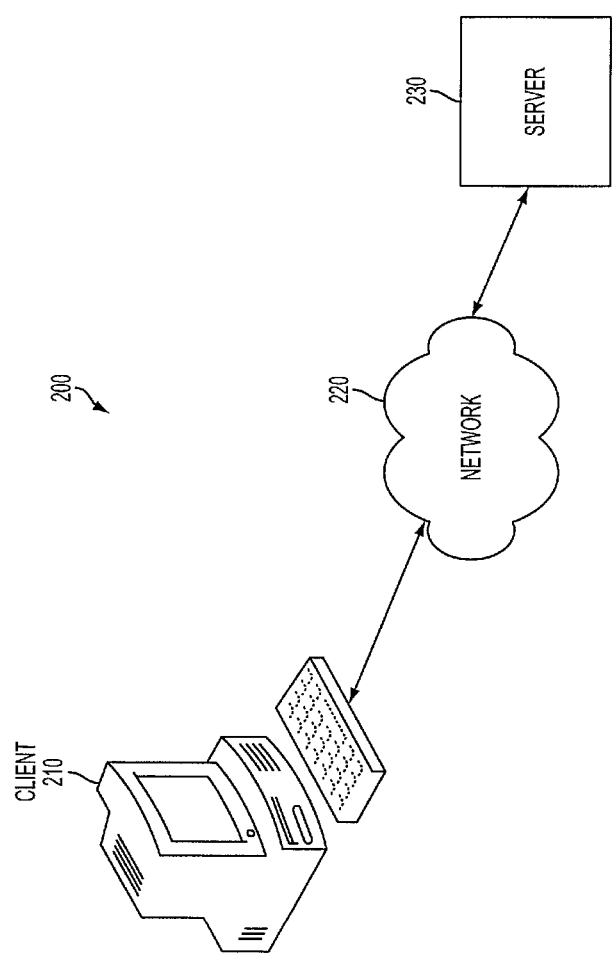
FIG. 2 is a block diagram of a communications system that includes a client configured to communicate across a network with a server.

Communications system 200 of FIG. 2 illustrates an exemplary communications system that includes a client 210 configured to provide an intelligent GUI capable of intelligently substituting display content in a window in response to user resizing of the window. The client 210 may be configured to communicate across a network 220 with server 230. Each of the client 210 and the server 230 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 210 and server 230 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium that is capable of being delivered to the client 210 or server 230.

The client 210 may include one or more devices capable of accessing content on the server 230. The server 230 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions. In another implementation, the client 210 may be a standalone system that does not communicate with the server 230 or with any other external systems. The client 210 may be configured to display a graphical user interface capable of substituting content within a resized window in response to a request to change the size of the window and simultaneously resizing multiple window panes in a graphical user interface in response to a user dragging a user interface element from one location in a display of the graphical user interface to another location.

The network 220 provides a direct or indirect communication link between the client system 210 and the server 230, irrespective of physical separation. Examples of a delivery network 220 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data.

The server 230 may include a general-purpose computer having a central processor unit (CPU), and memory/storage devices that store data and various programs such as an operating system and one or more application programs. Other examples of a server 230 includes a workstation, a server, a special purpose device or component, a broadcast system, other equipment, or some combination thereof capable of responding to and executing instructions in a defined manner. The server 230 also may include an input/output (I/O) device (e.g., video and audio input and conversion capability), and peripheral equipment such as a communications and or device (e.g., a modem or a network adapter) for exchanging data with the network 220.

Figure 3:
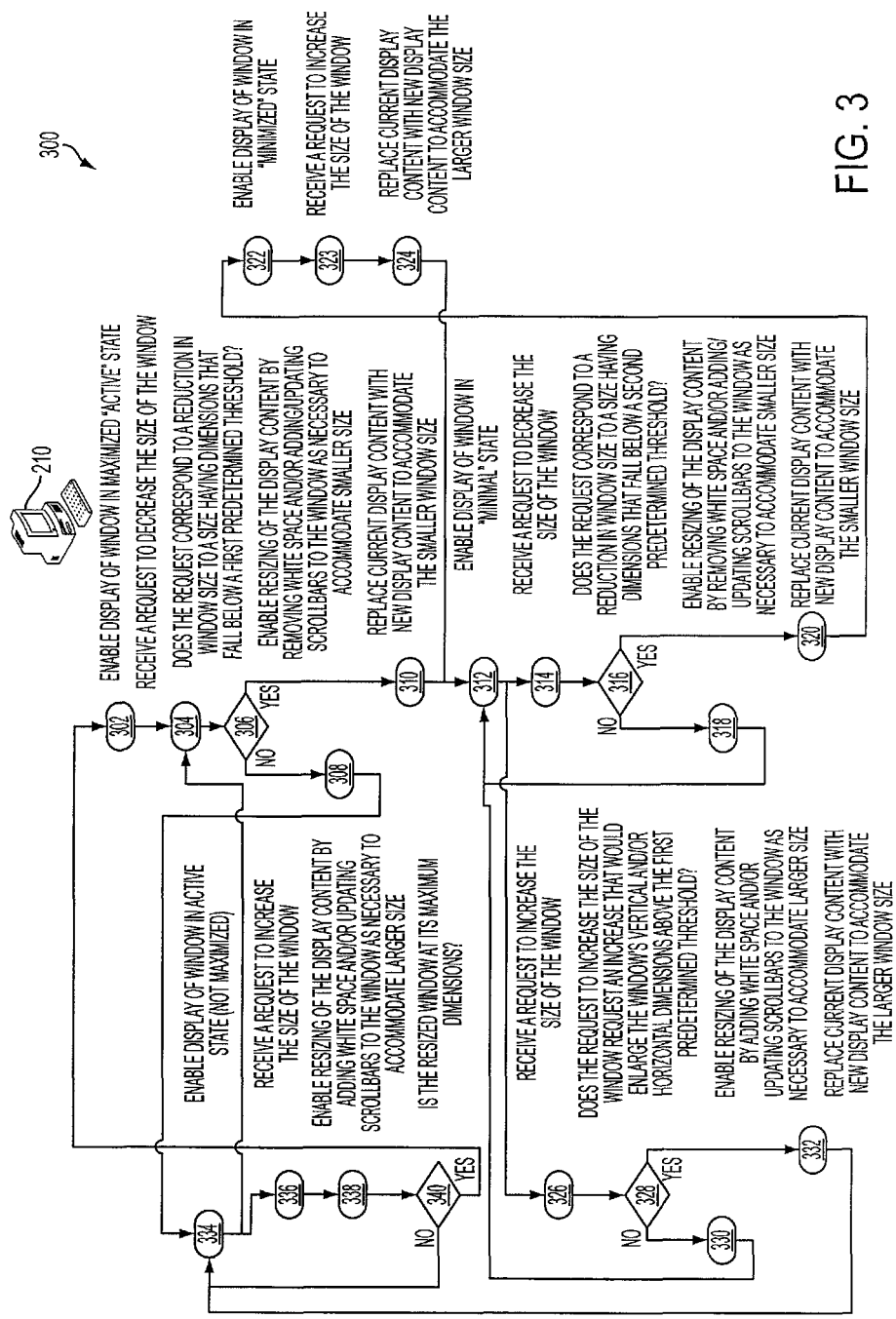
FIG. 3 is a flow chart of an exemplary process by which display content is replaced in a window of a graphical user interface in response to a change in the size of the window.

Process 300 of FIG. 3 illustrates an exemplary process for replacing display content in a window of a graphical user interface (GUI) in response to a request by a user to change the size of the window. Process 300 is a particular implementation of process 100 wherein the window has three states. The three states, listed in order of decreasing window size, are: (1) an "active" state; (2) a "minimal" state; and (3) a "minimized" state. Each of the three states has a corresponding display content specific to that state. For convenience, particular components described with respect to FIG. 2 are referenced as performing the process 300. However, similar methodologies may be applied in other implementations where different components are used to define the structure of the system, or where the functionality is distributed differently among the components shown by FIG. 2.

Process 300 includes client 210 enabling display of a window in an intelligent GUI in an active state that is maximized (i.e., the window is at its maximum vertical and horizontal dimensions) (302), in an active state that is not maximized (334), in a minimal state (312), and in a minimized state (322). For ease of exposition, the following description begins with the window being displayed in its active state when its dimensions are at their maximum values and progresses through operations that relate to a reduction in the window's size and then through operations that relate to an increase in the window's size.

Process 300 assumes that any given request to resize the window does not cause the window to skip a state when the window transitions from one state to another. In another implementation, the resizing of the window occurs in a progressive manner such that the window and its display contents are continually and progressively displayed and updated concurrent with the user, for example, dragging a mouse pointer across a graphical user interface display to resize the window. In this implementation, the window is continually updated through the resizing operation and, therefore, the window cannot skip a state when it is resized by the user. In another implementation, the user resizes an outline of the window (and not the window itself or its display contents) to set the size of the window, and the resized window and its display contents are only shown in response to and upon the user completing the resizing of the window outline. Once the user has completed the resizing of the window outline by, for example, dragging a mouse pointer across a graphical user interface display to resize the window outline, the window and its display contents are then displayed to conform to the resized window outline. In this implementation, the window may skip a state when it is resized by the user (e.g., the window may be resized from its active state to its minimized state without the user ever perceiving the window and its corresponding display contents in its minimal state).

The client 210 enables display of the window in an intelligent GUI in its active state when its dimensions are at their maximum values (302). When the window is in the active state, the window displays a first display content and is in a state in which the horizontal and vertical dimensions are above a first predetermined vertical and/or horizontal threshold value.

Figure 4:
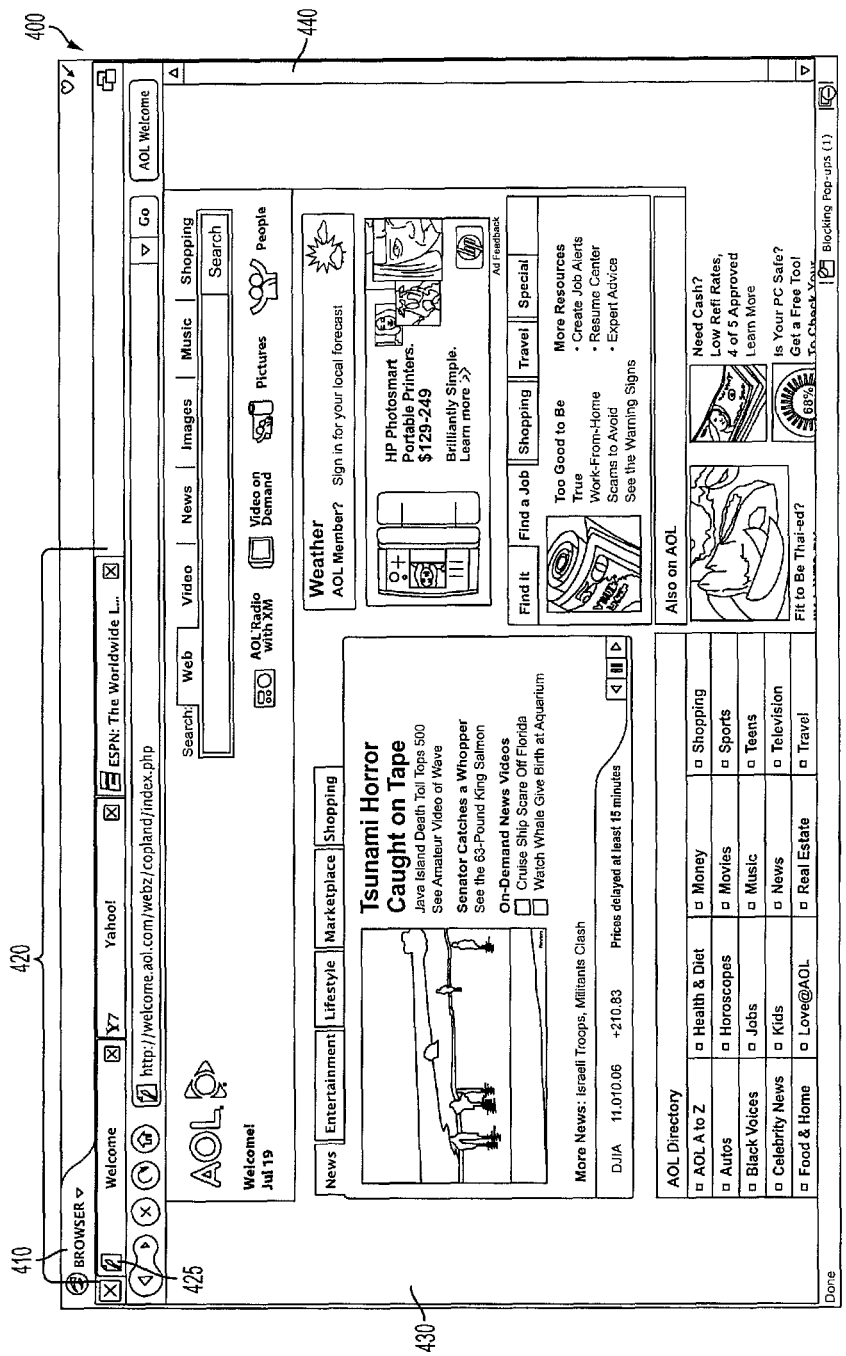
FIG. 4 is an illustration of a browser user interface window displayed in its active state when the window is at its maximum dimensions.

Window 400 of FIG. 4 is an exemplary window in its active state when its dimensions are at their maximum values. The window 400 includes a window title 410 that specifies the type of window as a "browser". The window 400 includes multiple tabs 420 that correspond to open browser sessions. Each tab has an icon, known as a "favicon", representing a web page active in the corresponding open browser session. Favicon 425 is a favicon for the web page active in the currently displayed open browser session. The window 400 includes display content 430 (i.e., the "first display content") for the current browser session (i.e., the browser session currently displaying the AOL Welcome Screen web page). The window 400 also includes a scroll bar 440 that may be manipulated by the user to scroll through the display content 430.

Referring back to FIG. 3, the client 210 receives a request from a user to decrease the dimensions of the window (304).

The request from the user may be generated in response to the user manually resizing the window by, for example, using a mouse or other input device to manually select a border of the window and dragging or otherwise moving the border. A determination is made whether the request to decrease corresponds to a request to decrease the window's vertical and/or horizontal dimensions below a first predetermined threshold value (306). If the request to decrease does not correspond to a decrease in the window's vertical and/or horizontal dimensions below the first predetermined threshold, the client 210 enables the GUI to accommodate the change in size of the window by removing white space in the first display content and/or adding/modifying scroll bars to the window as necessary (308). Once the window has been resized in this manner, the window remains in its active state but its dimensions are no longer at their maximum values (334), and the client system 210 waits for receipt of another request to change the window size from the user.

Figure 5:
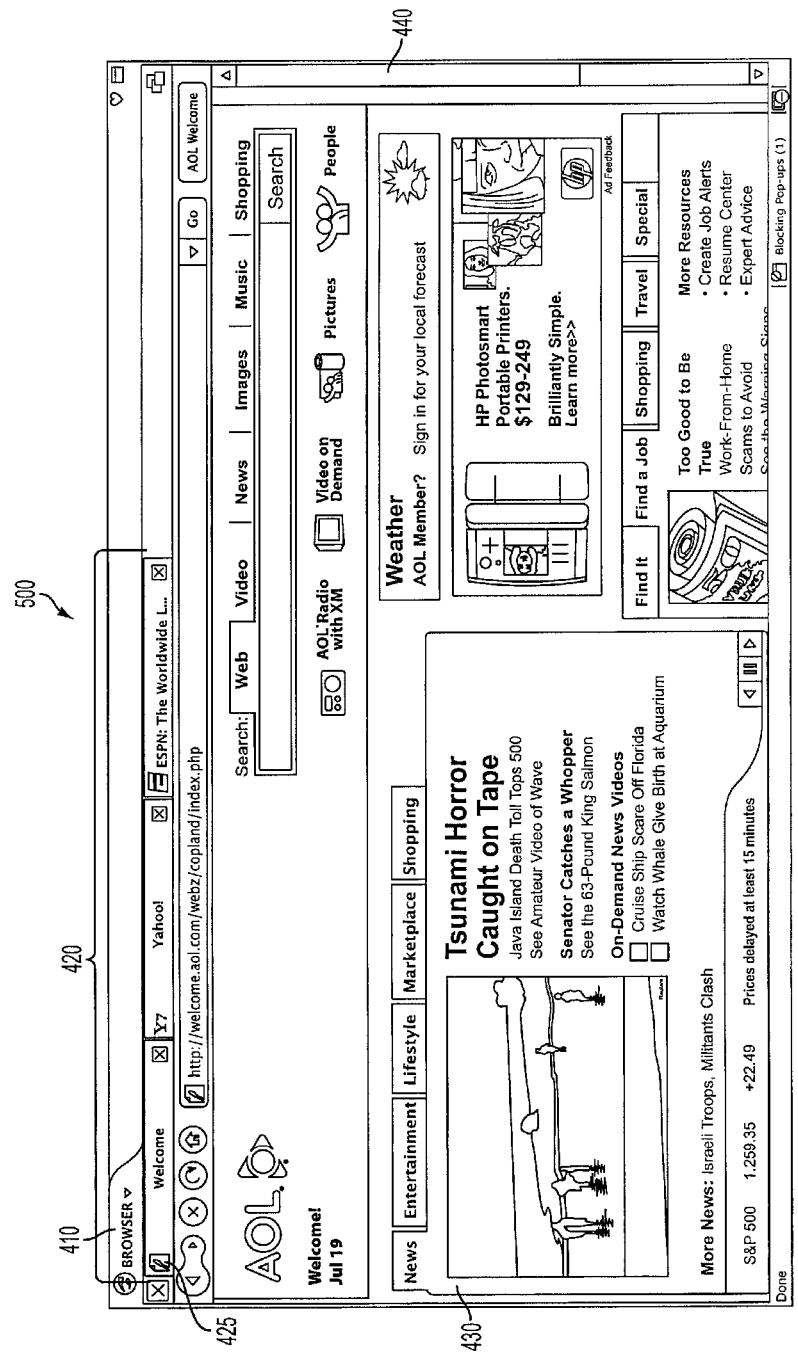
FIG. 5 is an illustration of a browser user interface window displayed in its active state.

Window 500 of FIG. 5 is an exemplary window of a browser user interface in its active state that corresponds to window 400 after the vertical and horizontal dimensions of the window have been reduced. The display content of user interface 500 remains essentially unchanged from that of user interface 400 (e.g., window title 410 is "browser", multiple tabs 420 are still displayed, and favicon 425 still corresponds to the currently active web page). As described in step 308 of process 300, display content 430, however, now contains less white space and scroll bar 440 is now shorter, with more area to scroll down.

Referring back to FIG. 3, if the request to decrease the window's dimensions corresponds to a decrease in the window's vertical and/or horizontal dimensions below the first predetermined threshold, the window transitions from the active state to a "minimal" state through a replacement of the first display content with a second display content that is better suited for the smaller window size (310 and 312). The minimal state may be: (1) a horizontally minimal state if the window's horizontal dimension drops below a first predetermined horizontal threshold value; (2) a vertically minimal state if the window's vertical dimension drops below a first predetermined vertical threshold value; or (3) a vertically and horizontally minimal state if both the window's vertical and horizontal dimensions drop below the first vertical threshold value and the first horizontal threshold value, respectively (or alternatively drop below other vertical and horizontal threshold values). Notably, a window in a vertically minimal state or in a horizontally minimal state may subsequently transition to a vertically and horizontally minimal state if the corresponding horizontal or vertical dimensions, respectively, drop below predetermined threshold values (e.g., drop below the first horizontal threshold value or the first vertical threshold value, respectively).

Window 600 of FIG. 6A is an exemplary window in a vertically minimal state; window 620 of FIG. 6B is an exemplary window in a horizontally minimal state; and window 640 of FIG. 6C is an exemplary window in a vertically and horizontally minimal state. If the active window 500 is decreased in size and its vertical dimension becomes less than a first predetermined vertical threshold value, second display content 604 is substituted for the first display content 430, as shown in window 600. The second display content 604 in this example is composed of multiple browser thumbnails. The current browser session is represented by a thumbnail 602 (i.e., a thumbnail representing the AOL Welcome Screen web page active in the current browser session) and the other open browser sessions corresponding to the other tabs 420 are represented by the other thumbnails (i.e., a thumbnail of the Yahoo! Web page active in one of the open browser sessions and a thumbnail of the ESPN Web page active in another of the open browser sessions).

If the active window 500 is decreased in size and its horizontal dimension becomes less than a first predetermined horizontal threshold value, a second display content 624 is substituted for the first display content 430, as shown in window 620. The second display content 624 in this example includes browser thumbnails similar to those of the second display content 604 but arranged vertically, rather than horizontally. The second display content includes a thumbnail 622 of the active web page in the current browser session to represent the current Browser session.

If the active window 500 is decreased in size and both its vertical dimension becomes less than a first predetermined vertical threshold value and its horizontal dimension becomes less than a first predetermined horizontal threshold value, second display content 642 is substituted for first display content 430, as shown in window 640. The second display content 642 includes a single thumbnail of the active web page in the current browser session to represent the current browser session. Due to the small size of the window, no thumbnails representing the other open browser sessions are displayed. Notably, second display content 604 of window 600 may be replaced with second display content 642 if the horizontal dimension of window 600 is reduced below the first predetermined horizontal threshold value (or below another threshold value). Similarly, second display content 624 of window 620 may be replaced with second display content 642 if the vertical dimension of window 620 is reduced below the first predetermined vertical threshold value (or below another threshold value).

In another implementation, a transition of the window from one state to another may cause not only a substitution of display content but also may cause the window dimensions to "snap" to a new set of initial values that may be smaller or larger than the predetermined threshold values used for triggering the transition from one state to another. For example, the window 620 may have fixed initial dimensions such that any transition to a horizontally minimal state from the active state results in the dimensions of the window 500 snapping or jumping to the initial fixed dimensions of window 620 shown in FIG. 6B. After the transition, the user may then be free to further change the dimensions of the window 620 from these initial fixed dimensions. If the initial fixed horizontal dimension of the window 620 is less than the first predetermined horizontal threshold value, then a transition from the active state to the horizontally minimal state may cause the window to appear to snap to a smaller size. In particular, if the user decreases the horizontal dimension of the window such that it is less than the first predetermined horizontal threshold value, thus triggering the transition, but greater than the initial fixed horizontal dimension of the window 620, the window will appear to snap or jump to conform to the smaller horizontal dimension of the window 620. Alternatively, if the initial fixed horizontal dimension of the window 620 is greater than the first predetermined horizontal threshold value, then a transition from the active state to the horizontally minimal state may cause the window to appear to snap to a larger size. In particular, if the user decreases the horizontal dimension of the window such that it is less than the first predetermined horizontal threshold value, thus triggering the transition, and less than the initial fixed horizontal dimension of the window 620, the window will appear to snap or jump to conform to the larger horizontal dimension of the window 620.

Referring back to FIG. 3, the client 210 receives a request from a user to further decrease the dimensions of the window, now in its minimal state (314). As before, the request from the user may be generated in response to the user manually resizing the window further by, for example, using a mouse or other input device to manually select a border of the window and dragging or otherwise moving the border. A determination is made whether the request to decrease corresponds to a request to decrease the window's vertical and/or horizontal dimensions below a second predetermined threshold value (316). If the request to decrease does not correspond to a decrease in the window's vertical and/or horizontal dimensions below the second predetermined threshold, the client 210 enables the GUI to accommodate the change in size of the window by continually removing white space in the second display content and/or adding/modifying scroll bars to the window as necessary (318). Once the window has been resized in this manner, the window remains in its minimal state but its dimensions are now smaller, and the client system 210 waits for receipt of another request to change the window size from the user (312).

If the request to decrease the window's dimensions corresponds to a decrease in the window's vertical and/or horizontal dimensions below the second predetermined threshold, the window transitions from the minimal state to a "minimized" state through a replacement of the second display content with a third display content that is better suited for the smaller window size (320 and 322). The minimized state may be: (1) a horizontally minimized state if the window's horizontal dimension drops below a second predetermined horizontal threshold value; or (2) a vertically minimized state if the window's vertical dimension drops below a second predetermined vertical threshold value.

In another implementation, the window also may transition to a horizontally and vertically minimized state if both the window's vertical and horizontal dimensions drop below the second vertical threshold value and the second horizontal threshold value, respectively (or alternatively drop below other vertical and horizontal threshold values). Notably, in this implementation, a window in a vertically minimized state or in a horizontally minimized state may subsequently transition to a vertically and horizontally minimized state if the corresponding horizontal or vertical dimensions, respectively, drop below predetermined threshold values (e.g., drop below the second horizontal threshold value or the second vertical threshold value, respectively).

Figure 8A:
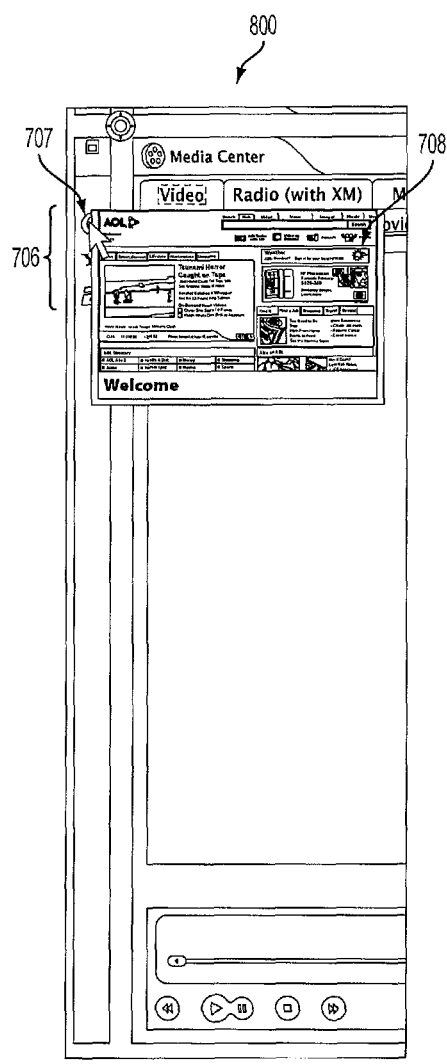

Menu bar 700 of FIG. 7B is an exemplary menu bar corresponding to a window in a horizontally minimized state, and menu bar 720 of FIG. 7A is an exemplary menu bar corresponding to a window in a vertically minimized state. If the minimal window 600, 620, 640 is decreased in size and its horizontal dimension becomes less than a second predetermined horizontal threshold value, a vertical menu bar 700 including third display content 706 is substituted for window 600, 620, 640. The third display content 706 includes a favicon for each web page active in the current and open browser sessions. Hovering a mouse pointer over a favicon causes a display of a thumbnail of the web page to which the favicon corresponds. For example, as shown in FIG. 8A, hovering over favicon 707 displays thumbnail 708 of the AOL Welcome Screen web page.

If the minimal window 600, 620, 640 is decreased in size and its vertical dimension becomes less than a second predetermined vertical threshold value, a horizontal menu bar 720 including third display content 726 is substituted for window 600, 620, 640. The third display content 726 in this example includes favicons similar to those of the third display content 706 but arranged horizontally, rather than vertically. As shown in FIG. 8B, hovering a mouse pointer over favicon 727 displays thumbnail 728 of the AOL Welcome Screen web page.

Referring back to FIG. 3, when the window is in its minimized state, the client system 210 may receive a request to increase the size of the window (323). In this implementation, any request to increase the size of the window from its minimized state immediately causes the window to enter its minimal state through a replacement of the third display content with the second display content, which is better suited to the larger window size (324). In one particular implementation example, the window may automatically snap from the menu bar 700, 720 of FIGS. 7A-7B to one of the minimal windows 600, 620 or 640 having an initial fixed size corresponding to that shown in FIGS. 6A-6C. In another implementation, the window may jump to either its minimal state or its active state depending on the increase in window size requested by the user.

Another request to increase the size of the window may be received when the window is displayed in its minimal state (312 and 326). A determination is made whether the request to increase corresponds to a request to increase the window's vertical and/or horizontal dimensions above the first predetermined threshold value (328). If the request to increase does not correspond to an increase in the window's vertical and/or horizontal dimensions above the first predetermined threshold, the client 210 enables the GUI to accommodate the change in size of the window by continually adding white space in the second display content and/or updating scroll bars to the window as necessary (330). Once the window has been resized in this manner, the window remains in its minimal state but its dimensions are now larger, and the client system 210 waits for receipt of another request to change the window size from the user (312).

If the request to increase the window's dimensions corresponds to an increase in the window's vertical and/or horizontal dimensions above the first predetermined threshold, the window transitions from the minimal state to the active state through a replacement of the second display content with the first display content, the first display content being better able to take advantage of the larger window size than the second display content (332 and 334). The window is displayed in its active state (334 or 302). If the resizing of the window does not result in the window achieving its maximum dimensions, then a request to further increase the size of the window may be received (336). The GUI accommodates the increase in size of the window by continually adding white space in the second display content and/or updating scroll bars to the window as necessary (338). A determination is made whether the further resizing of the window results in the window achieving its maximum dimensions (340). If so, the window is displayed in its maximized active state (302). If not, the window is displayed in its non-maximized active state (334).

While process 300 contemplates three different window size states (i.e., active, minimal, and minimized) and a change of window display content at two transition points (i.e., the first display content is replaced by the second display content at the active/minimal state transition which is then replaced by a menu bar at the minimal/minimized state transition), any number of window size states and display content transition points is contemplated. For example, in another exemplary implementation, a GUI may have eight different window states and seven different transition points at which display content is replaced. In yet another exemplary implementation, a GUI may have two different window states and only one transition point at which display content is replaced.

While process 300 may be used to intelligently resize a browser user interface window as shown in FIGS. 4, 5, 6A-6C, 7A-7B, and 8A-8B, process 300 also may be used to intelligently resize other types of user interface windows. For example, process 300 may be used to intelligently resize a window of a media center user interface, a window of an instant messaging or people user interface, and a window of an e-mail user interface. Each of these examples is described in further detail below in reference to FIGS. 9-23B.

Figure 9:
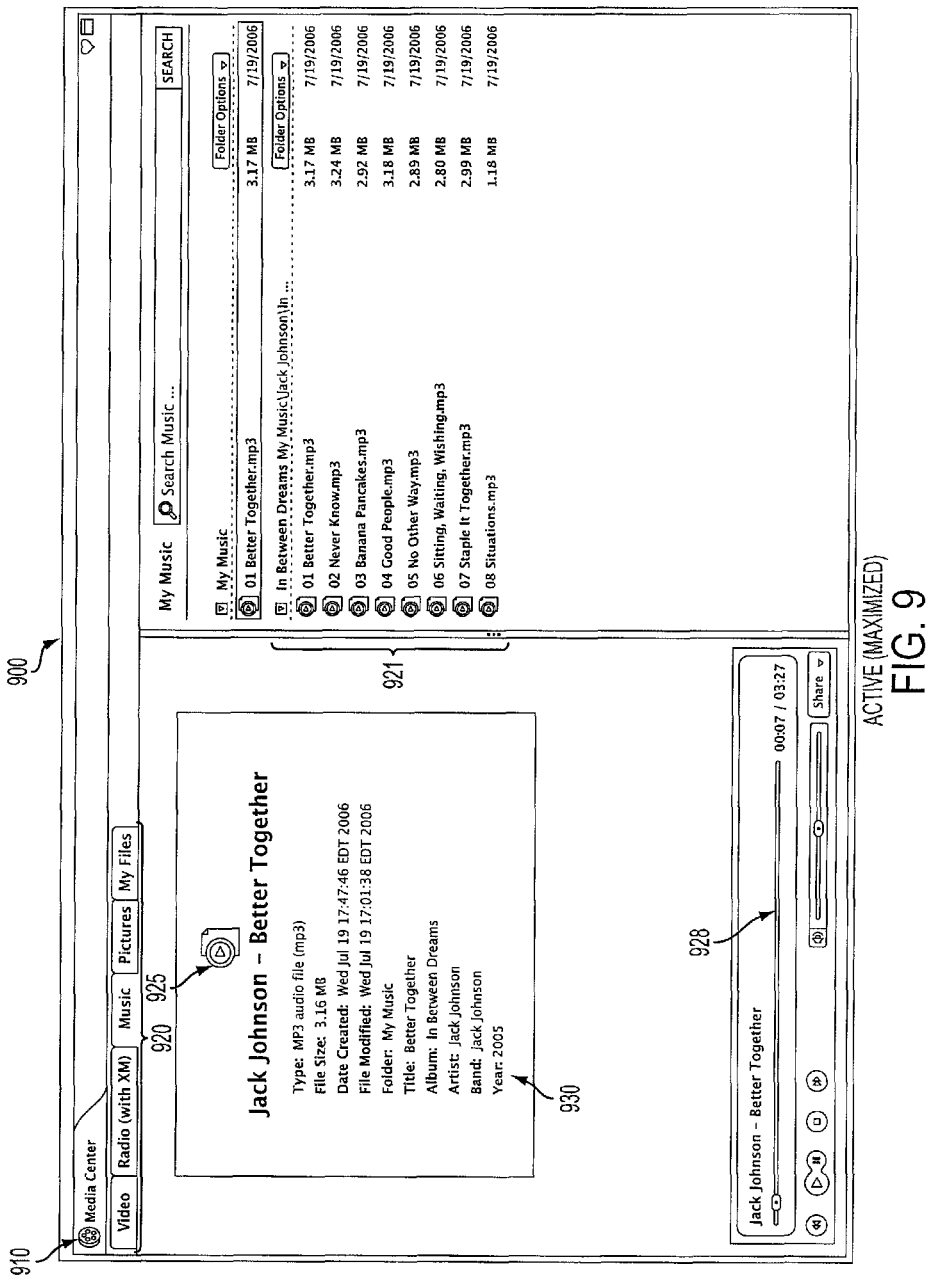
FIG. 9 is an illustration of a media center user interface window displayed in its active state when the window is at its maximum dimensions.

FIGS. 9, 10, 11-11C, 12A, 12B, 13A and 13B show illustrations of a window of a media center user interface at the various states of the process 300. Window 900 of FIG. 9 is an exemplary window of a media center user interface in its active state when its dimensions are at their maximum values. This state corresponds to step 302 of process 300. The window 900 includes a window title 910 that indicates the type of window as "media center" and includes multiple tabs 920 corresponding to different open media center sessions. The user may select a tab from among the multiple tabs 920 to interact with the corresponding open media center session. Icon 925 represents the media file active in the currently selected media session. The icon 925 may be, for example, a graphic that indicates the type of media file (e.g., a graphic corresponding to an audio, video, or picture file), an album cover for a song or music album file, or a thumbnail of a picture or video for a picture or video file. Display content 930 represents the current media center session and may include, for example, information about the currently selected media file (e.g., title, artist, and year made) as well as a playlist 921 of other media files accessible in the current media center session. The window 900 also includes controls 928 that include a variety of tools that enable a user to control playback for the various types of media supported by the media center application (e.g., tracking, play/pause and volume).

Figure 10:
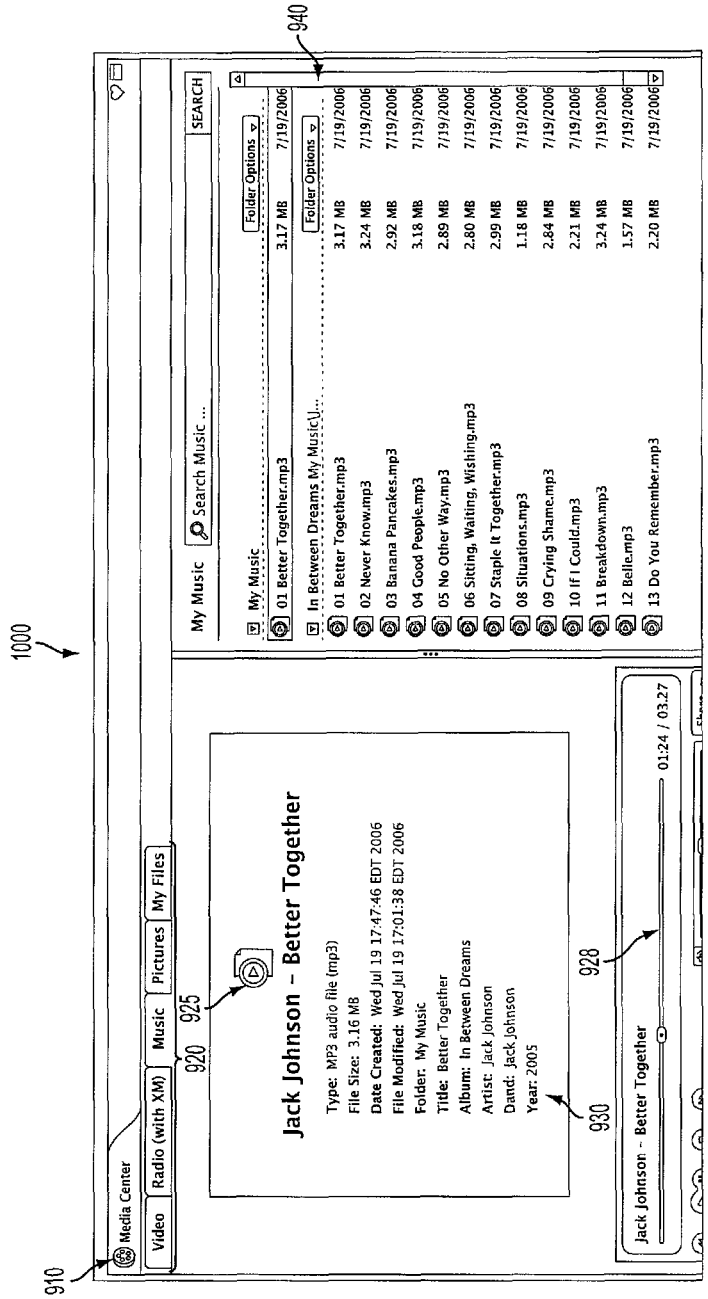
FIG. 10 is an illustration of a media center user interface window displayed in its active state.
Figure 11:
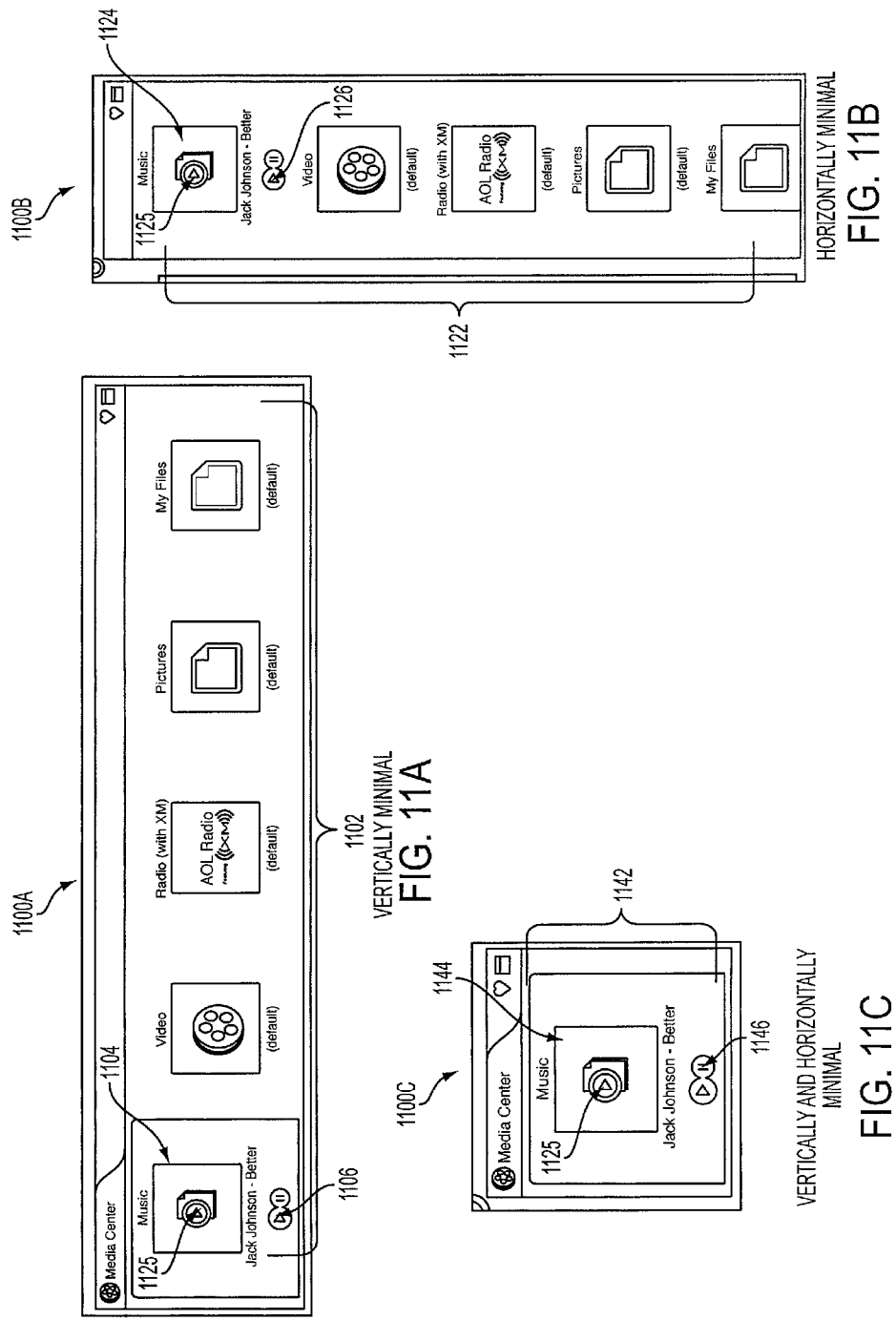
FIGS. 11A-11C are illustrations of media center user interface windows displayed in various minimal state.
Figure 12:
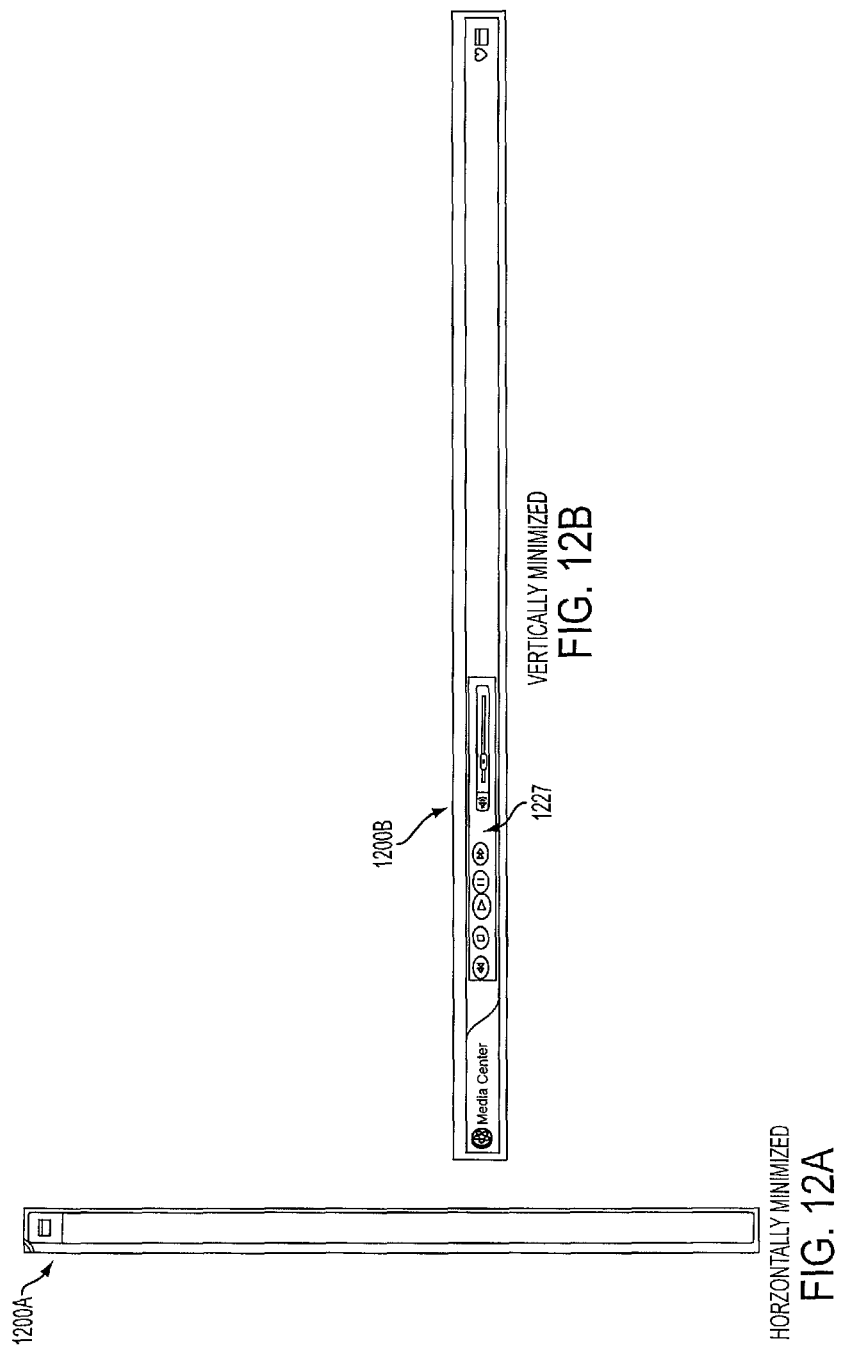
FIGS. 12A-12B are illustrations of media center user interface windows displayed in various minimized states.
Figure 13:
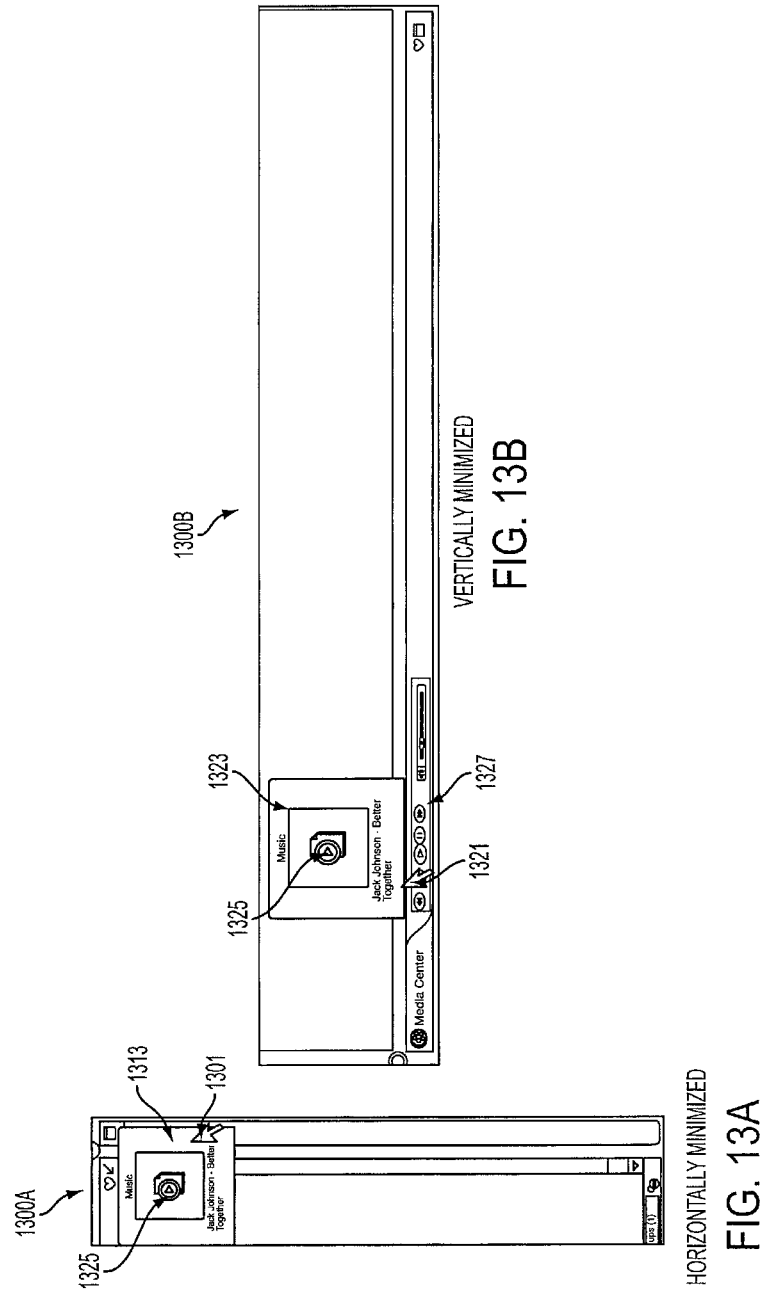
FIGS. 13A-13B are illustrations of media center user interface windows displayed in various minimized states.

Window 1000 of FIG. 10 is an exemplary window of a media center user interface in its active state that corresponds to window 900 after the vertical and horizontal dimensions of the window have been reduced. This state corresponds to step 334 of process 300. The display content of window 1000 remains essentially unchanged from window 900 (e.g., window title 910 is "media center", multiple tabs 920 are displayed, and icon 925 corresponds to the current media) As described in step 308 of process 300, display content 930 now contains less white space at this level and scroll bar 940 is now present to accommodate the smaller size.

Window 1100A of FIG. 11A is an exemplary window in a vertically minimal state; window 1100B of FIG. 11B is an exemplary window in a horizontally minimal state; and window 1100C of FIG. 11C is an exemplary window in a vertically and horizontally minimal state. These states correspond to step 312 of process 300. As the size of the window 1000 is reduced and its vertical dimension becomes less than a first predetermined vertical threshold value, display content 930 of window 1000 is replaced by new display content 1102, thereby transforming window 1000 to window 1100A. The new display content 1102 includes media center session thumbnails. Each media center session thumbnail represents an open media center session and may include visual content that indicates the type of content of the corresponding open session (e.g., music, video, picture, text files). The current media center session is indicated by thumbnail 1104, which includes icon 1125 representing the active media file in the current media center session (i.e., Jack Johnson—Better Together). Thumbnail 1104 is visually distinguished from the other thumbnails of open media sessions in that it is encompassed by a selection square that includes controls 1106.

Controls 1106 may be used to control or playback the media file active in the current media center session.

Alternatively, as the size of the window 1000 is reduced and its horizontal dimension becomes less than a first predetermined horizontal threshold value, display content 930 of window 1000 is replaced by new display content 1122, thereby transforming window 1000 into window 1100B. The new display content 1122 includes media center session thumbnails similar to the media center session thumbnails of display content 1102 but arranged vertically, rather than horizontally. The current media center session is indicated by thumbnail 1124. Controls 1126 are present to control the active media file in the current media center session while displayed in thumbnail form.

Additionally, as the size of the window 1000 (or 1100A or 1100B) is reduced and both its horizontal and vertical dimensions become less than their respective predetermined threshold values, display content 930 (or 1102 or 1122) is replaced by new display content 1142 in window 1000 (or 1100A or 1100B), as shown by window 1100C. The new display content 1142 includes a single thumbnail 1144 representing the current media center session and the active media file in the current media center session (i.e., Jack Johnson—Better Together). Lastly, controls 1146 are present to control the media file active in the current media center session.

Menu bar 1200A of FIG. 12A is an exemplary menu bar corresponding to a media center user interface window in a horizontally minimized state, and menu bar 1200B of FIG. 12B is an exemplary menu bar corresponding to a media center user interface window in a vertically minimized state. These states correspond to step 322 of process 300. As the size of the minimal window 1100A, 1100B or 1100C is reduced and its horizontal dimension becomes less than a predetermined horizontal threshold value, media center thumbnails 1102, 1122 and 1142, respectively, are replaced in the media center user interface by a menu bar 1200A. As shown in FIG. 13A, hovering a mouse pointer 1301 over the menu bar 1200A results in a display of a thumbnail 1313 that includes an icon 1325 that represents the media file active in the current media center session (i.e., Jack Johnson—Better Together).

Alternatively, as the size of a minimal window 1100A, 1100B or 1100C becomes smaller and its vertical dimension becomes less than a predetermined value, media center thumbnails 1102, 1122 and 1142, respectively, are replaced in the media center user interface by a menu bar 1200B. As shown in FIG. 13B, hovering a mouse pointer 1321 over the menu bar 1200B results in a display of thumbnail icon 1323 that represents the current media center session. Additionally, controls 1227, 1327 are displayed to allow control over the media file active in the current media center session.

Figure 14:
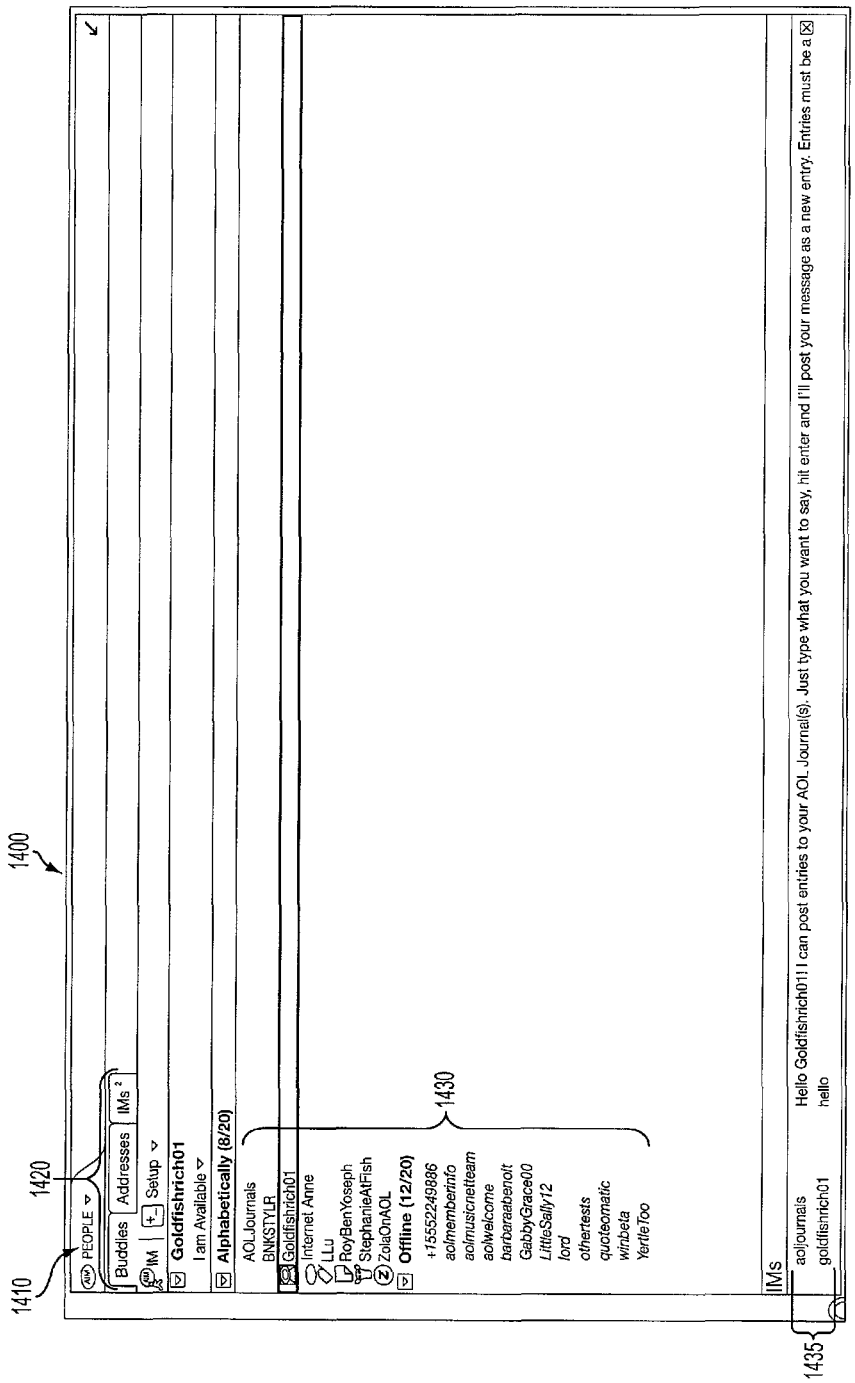
FIG. 14 is an illustration of a people user interface window displayed in its active state when the window is at its maximum dimensions.

FIGS. 14, 15, 16A, 16B, 17A, 17B, 18A, and 18B are illustrations of a window of a people user interface at the various states of the process 300. Users may interact with the people user interface to communicate with each other via instant messaging. Window 1400 of FIG. 14 is an exemplary window of a people user interface at its maximized state. This state corresponds to step 302 of process 300. The window 1400 includes a window title 1410 that indicates the type of window as "people" (i.e., a window configured to enable instant messaging between users). The window 1400 further includes multiple tabs 1420 corresponding to different instant messaging functionality.

User selection of each of the multiple tabs 1420 results in display of an interface with which the user may interact to perform various instant messaging functions. The currently selected tab is the "buddies" tab and the corresponding display is a buddy list 1430 of the user. The buddy list 1430 includes the online identities of each of the user's buddies, a corresponding buddy icon, and an indicator of their respective online presence. In this particular example, the user has 20 buddies, 8 of which are currently online and available to receive instant messages from the user. The multiple tabs 1420 also include an "addresses" tab, the selection of which results in display of an interface with which the user may interact to add, edit, or delete the IM addresses in the user's buddy list 1430. The multiple tabs 1420 include an "IMs" tab, which may be selected by the user to interact with and display open IM communication sessions with other users.

The window 1400 also includes an "IM snapshot" display 1435, which displays a list of online identities with which the user is currently engaging in IM communications and displays the text of the last IM received from each corresponding online identity. In the illustrated example, the user is engaged in IM communications with "aoljournals" and "goldfishrich01" and the text of the last IM received from each of aoljournals and goldfishrich01 is displayed. In another implementation, the IM snapshot display 1435 only lists the online identities and corresponding IM text for the last two online identities from which an IM was received.

Figure 15:
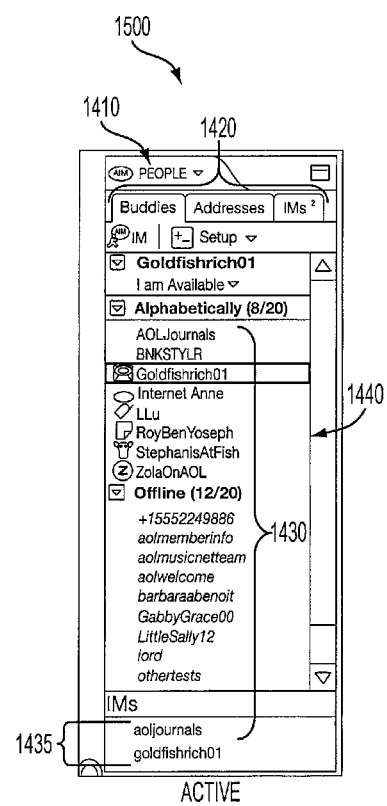
FIG. 15 is an illustration of a people user interface window displayed in its active state.

Window 1500 of FIG. 15 is an exemplary window of a people user interface in its active state that corresponds to window 1400 after the vertical and horizontal dimensions of the window have been reduced. This state corresponds to step 334 of process 300. The display content of window 1500 remains essentially unchanged from that of user interface 1400 (e.g., window title 1410 is "people", graphical user interface elements 1420 are multiple tabs). As described in step 308 of process 300, buddy list 1430 now contains less white space and scroll bar 1440 is present to accommodate the smaller size. Furthermore, IM snapshot display 1435 no longer displays IM text.

Window 1600A of FIG. 16A is an exemplary people user interface window in a vertically minimal state; and window 1600B of FIG. 16B is an exemplary people user interface window in a vertically and horizontally minimal state. These states correspond to step 312 of process 300. As the size of the window 1500 is reduced and its vertical dimension becomes less than a predetermined vertical threshold value, buddy list 1430 and IM snapshot display 1435 are replaced by modified buddy list 1602 and modified IM snapshot display 1607, thereby transforming window 1500 to window 1600A. The modified buddy list 1602 corresponds to buddy list 1430 except that the list no longer displays the online identifiers of those users that are currently offline. The modified IM snapshot display 1607 corresponds to IM snapshot display 1435 except that it has been repositioned horizontally and once again includes IM text. Notably, in this implementation, the scroll bar 1440 and the tabs 1420 from people user interface 1500 have been removed.

As the size of the window 1600A is reduced and its horizontal dimension becomes less than a first predetermined horizontal threshold value, modified buddy list 1602 and modified IM snapshot display 1607 are replaced by modified buddy list 1622 and modified IM snapshot display 1624, thereby transforming window 1600A to window 1600B. The modified buddy list 1622 is a truncated version of modified buddy list 1602 (i.e., it shows less than all of the identities shown in the modified buddy list 1602). The modified IM snapshot display 1624 corresponds to IM snapshot display 1607 except that it has been repositioned vertically and no longer includes IM text.

Notably, unlike the other user interface examples previously described, the people user interface window does not have a horizontally minimal state. In other words, as the horizontal dimension of the window in its active state is decreased, the window does not transition to a minimal state, but rather transitions from the active state to the minimized state, skipping the minimal state. This is an example of how a window can be customized such that content substitution and state transitions vary based on the direction of the increase/decrease of the size of the window. In this case, increasing/decreasing only the horizontal dimension of the window results in the window transitioning between only two states— the active state and the minimized state, while increasing/decreasing only the vertical dimension of the window results in the window transitioning between three states—the active state, the vertically minimal state, and the vertically minimized state. The number of states, the number of transitions, and the dependency of the transitions on the window resizing direction may be chosen in accordance with predetermined business rules to best suit the given user interface needs.

Menu bar 1700A of FIG. 17A is an exemplary menu bar corresponding to a people user interface window in a horizontally minimized state, and menu bar 1700B of FIG. 17B is an exemplary menu bar corresponding to a people user interface window in a vertically minimized state. These states correspond to step 322 of process 300. As the size of the minimal windows 1600A, 1600B, or active window 1500 becomes smaller and their horizontal dimension becomes less than a predetermined value, a menu bar 1700A is substituted for the display content in the minimal window 1600A, 1600B or active window 1500. The menu bar 1700A includes buddy icons 1703 for buddies with which the user currently has an open IM communications session. As shown in FIG. 18A, hovering a mouse pointer 1801 over one of the buddy icons 1703 causes a display of a snapshot of an active conversation with the buddy. For example, hovering the mouse pointer 1801 over icon 1805 displays conversation snapshot 1807 with buddy Goldfishrich01.

Alternatively, as the size of a minimal window 1600A or 1600B becomes smaller and its vertical dimension becomes less than a predetermined value, the display content in the minimal window 1600A or 1600B is replaced in the people user interface by a menu bar 1700B. The menu bar 1700B includes buddy icons 1703 for buddies with which the user currently has an open IM communications session. As shown in FIG. 18B, hovering a mouse pointer 1821 over icon 1825 displays conversation snapshot 1827 with buddy Goldfishrich01.

Figure 19:
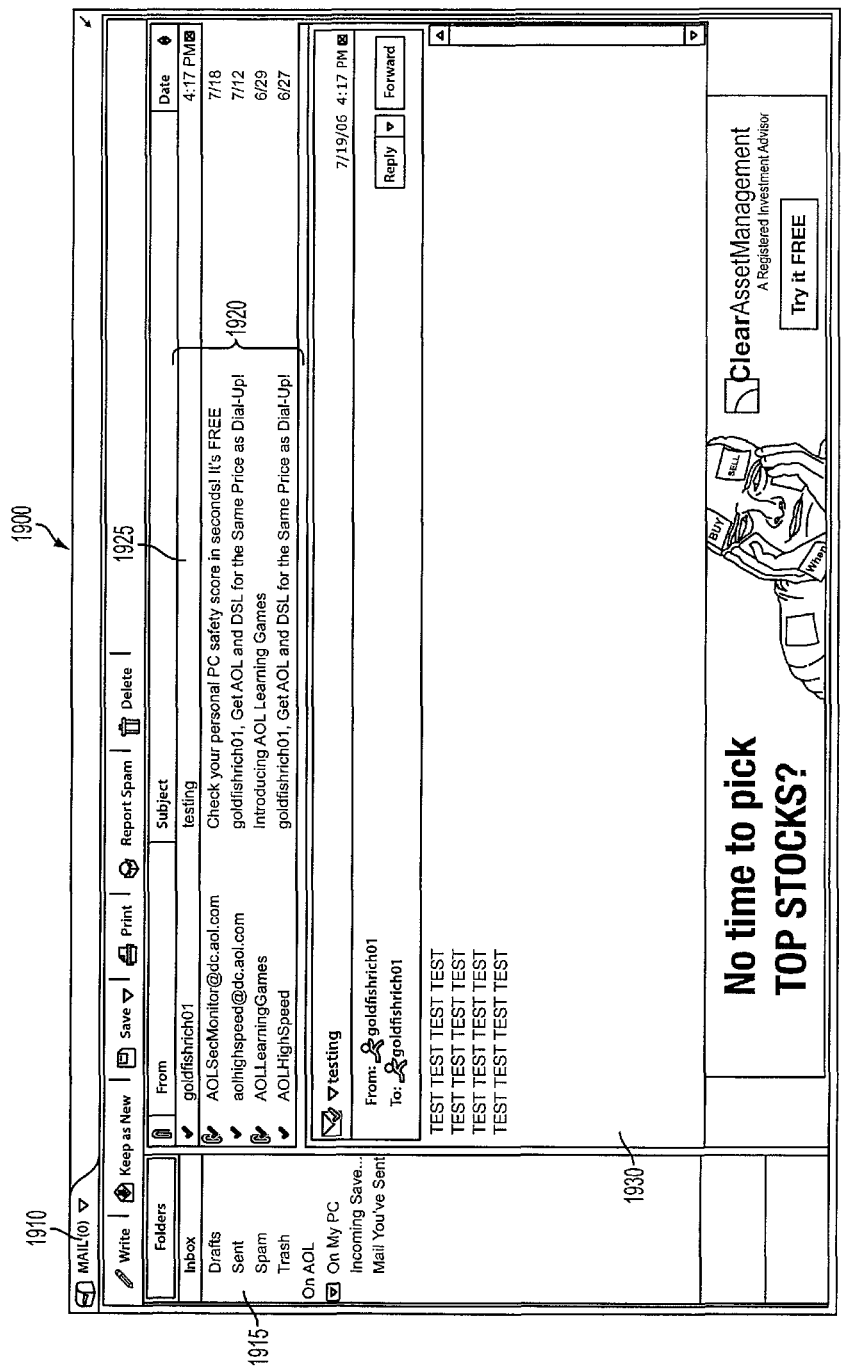
FIG. 19 is an illustration of a people user interface window displayed in its active state when the window is at its maximum dimensions.

FIGS. 19, 20, 21A-21C, 22A, 22B, 23A and 23B show illustrations of a window of a mail user interface at various states of the process 300. Users may interact with the mail user interface to communicate with each other via e-mail. Window 1900 of FIG. 19 is an exemplary window of a mail user interface in its active state when its dimensions are at their maximum values. This state corresponds to step 302 of process 300. The window 1900 includes a window title 1910 that indicates the type of window as "mail" and includes a display 1915 of the user's e-mail folders. The window 1900 includes a list of e-mail entries 1920 corresponding to e-mails in the user's inbox folder. Each e-mail entry in the list 1920 includes an identifier of the sender of the e-mail, the subject matter of the e-mail, and the date that the e-mail was received. E-mail entry 1925 is highlighted and corresponds to the e-mail currently selected by the user. The message content of the e-mail currently selected by the user is shown in display 1930.

Figure 20:
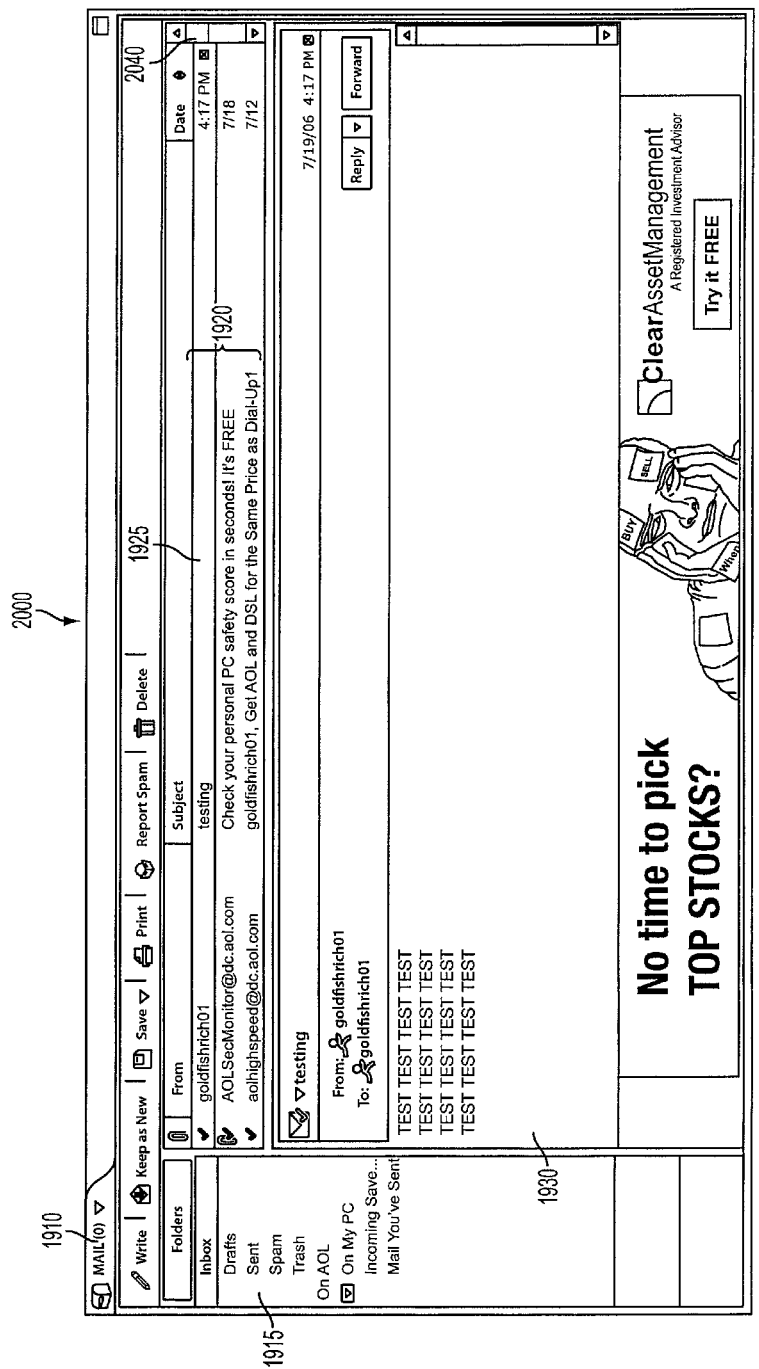
FIG. 20 is an illustration of a mail user interface window displayed in its active state.
Figure 21:
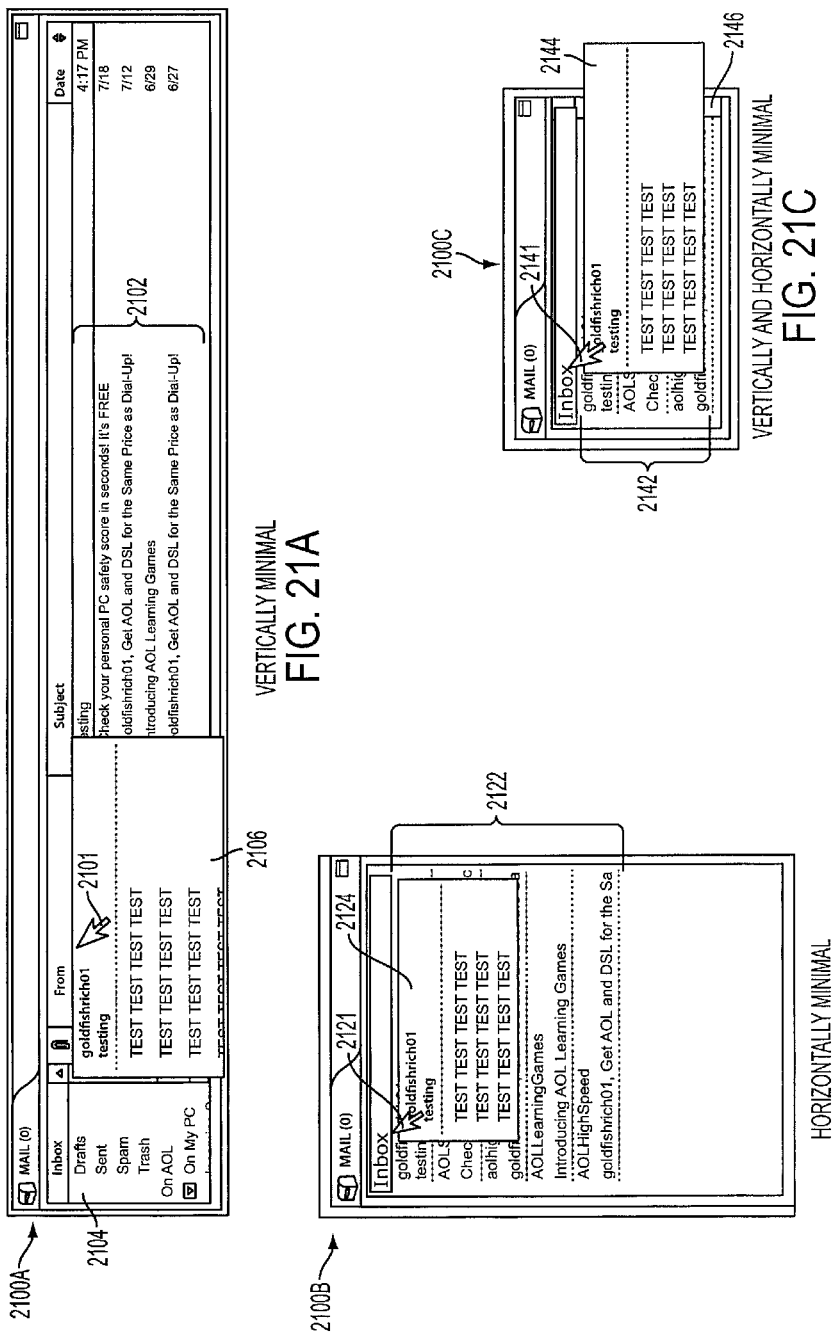
FIGS. 21A-21C are illustrations of mail user interface windows displayed in various minimal states.
Figure 22:
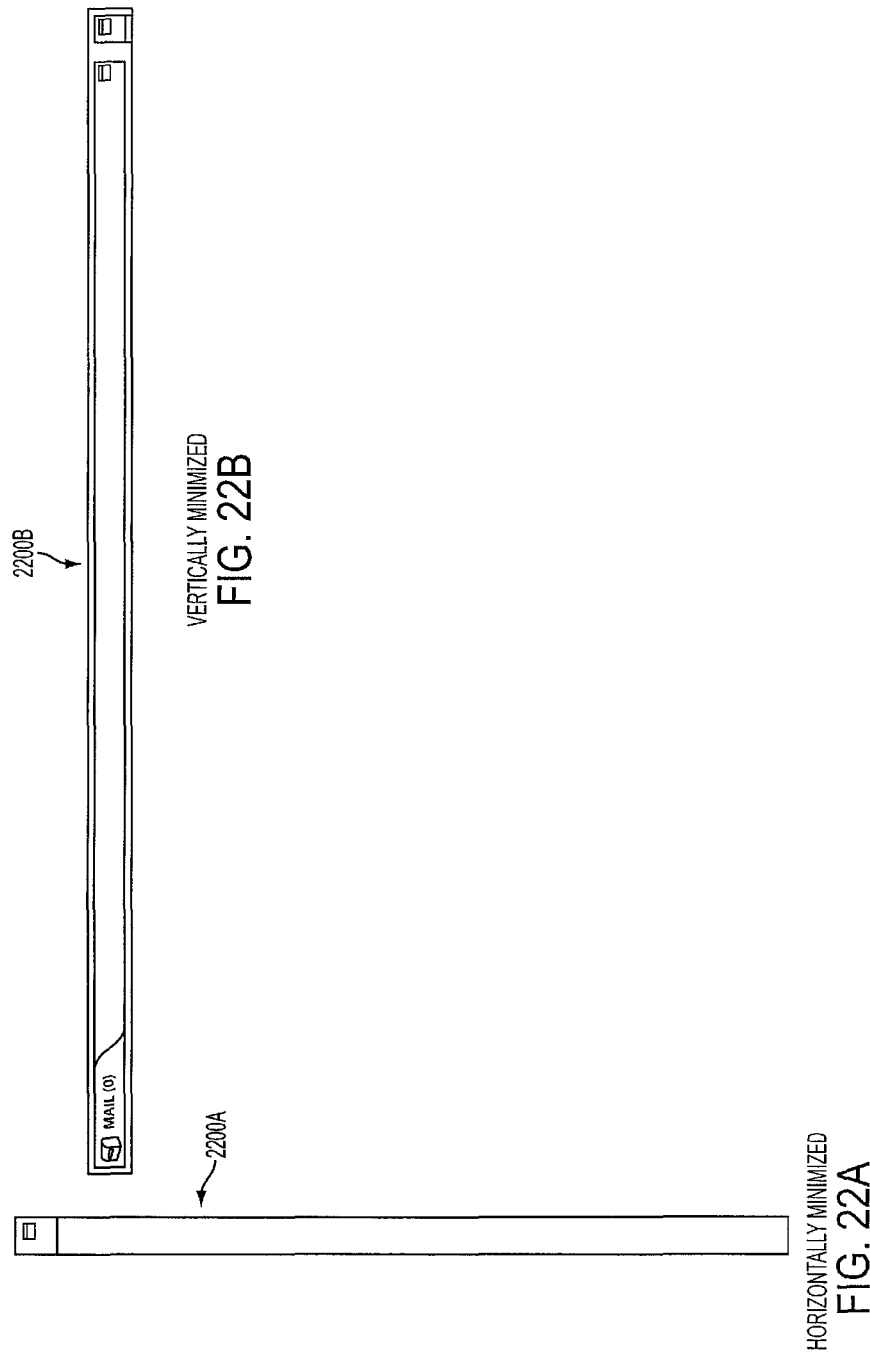
FIGS. 22A-22B are illustrations of mail user interface windows displayed in various minimized states.
Figure 23:
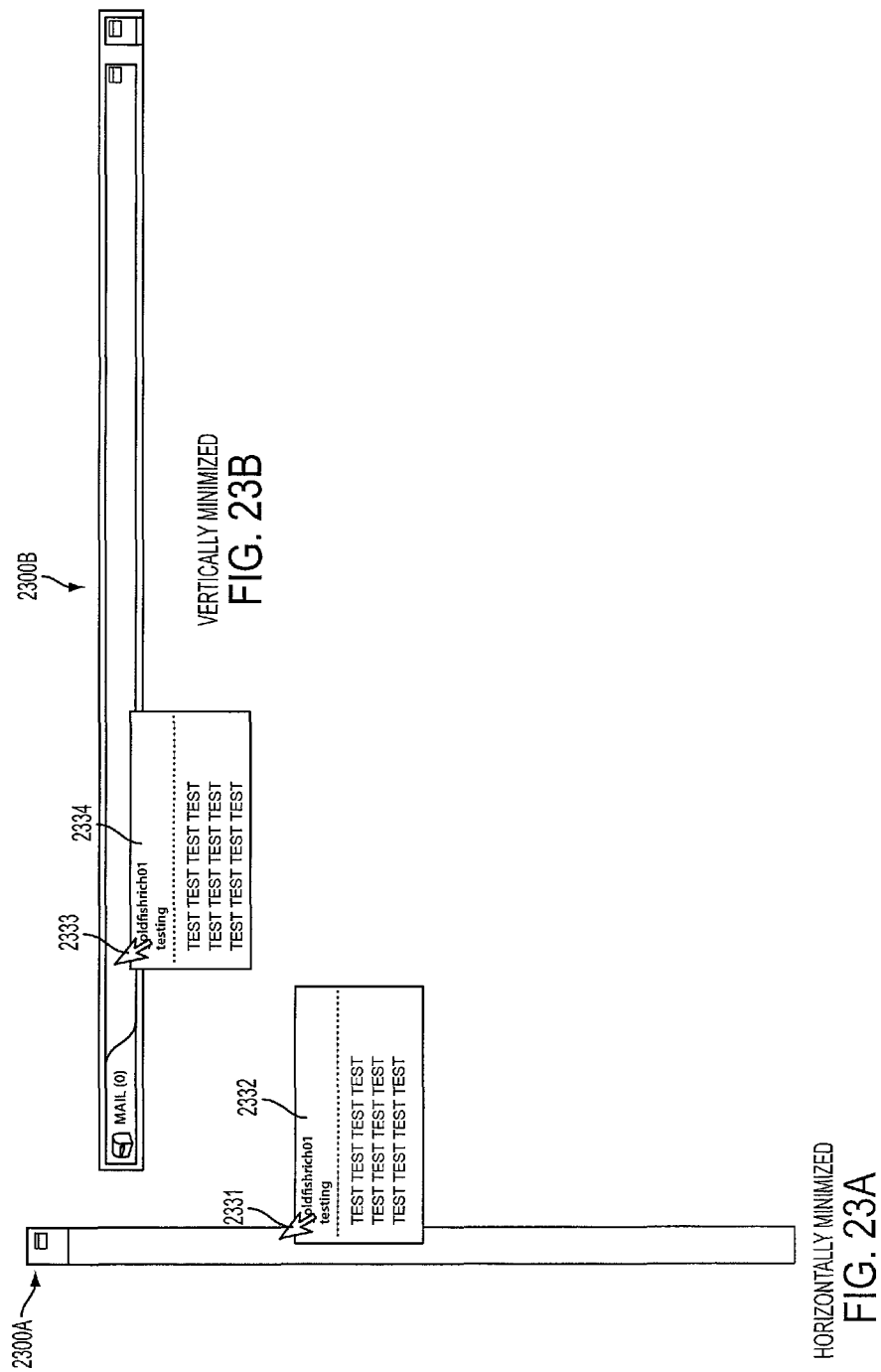
FIGS. 23A-23B are illustrations of mail user interface windows displayed in various minimized states.

Window 2000 of FIG. 20 is an exemplary window of a mail user interface in its active state that corresponds to window 1900 after the vertical and horizontal dimensions of the window have been reduced. This state corresponds to step 312 of process 300. The display content of window 2000 remains essentially unchanged from that of window 1900 (e.g., window title 1910 is "mail" and display 1930 shows the message content of the e-mail corresponding to selected e-mail entry 1925). As described in step 308 of process 300, only a portion of the list 1920 is now displayed and a scroll bar 2040 has been added to enable the user to scroll through the complete list.

Window 2100A of FIG. 21A is an exemplary mail user interface window in a vertically minimal state; window 2100B of FIG. 21B is an exemplary mail user interface window in a horizontally minimal state; and window 2100C of FIG. 21C is an exemplary mail user interface window in a vertically and horizontally minimal state. These states correspond to step 312 of process 300. As the size of the window 2000 is reduced and its vertical dimension becomes less than a predetermined vertical threshold value, new display content is substituted for the display content of window 2000, thereby transforming window 2000 into window 2100A. In particular, the new display content includes a list 2102 that corresponds to the list 1920 and a display 2104 corresponding to the display 1915. Window 2100A, however, in contrast to window 2000, does not display the message content of the selected e-mail in a separate static section of the window. Rather, hovering a mouse pointer 2101 over the selected e-mail entry (or any other e-mail entry) results in a display 2106 (e.g., a pop-up display) that includes a text snapshot of the message contents of the selected e-mail (or other e-mail). In another implementation, hovering the mouse pointer 2101 over an e-mail entry in the list 2102 results in a display 2106 (e.g., a pop-up display) of the complete message contents of the corresponding e-mail.

Alternatively, as the size of the window 2000 is reduced and its horizontal dimension becomes less than a first predetermined horizontal threshold value, new display content is substituted for the display content of window 1900, thereby transforming window 1900 to window 2100B. In particular, the new display content includes a list 2122 that corresponds to the list 1920 but includes less information (i.e., it no longer displays the date of receipt of the e-mail). Additionally, the new display content does not include a folder display corresponding to the display 1915 of window 2000, and does not include a message contents display corresponding to the display 1930 of window 2000. Window 2100B, in contrast to window 2000, does not display the message content of the selected e-mail in a separate static section of the window. Rather, hovering a mouse pointer 2121 over an e-mail entry in the list 2122 results in a display 2124 (e.g., a pop-up display) that includes a text snapshot of the message contents of the corresponding e-mail. In another implementation, hovering the mouse pointer 2121 over an e-mail entry in the list 2122 results in a display 2124 (e.g., a pop-up display) of the complete message contents of the corresponding e-mail.

Additionally, as the size of the window 2000 is reduced and both its horizontal and vertical dimensions become less than their respective predetermined threshold values, new display content is substituted for the display content of window 2000, thereby transforming window 2000 to window 2100C. In particular, the new display content includes what is essentially a smaller version of window 2100B that includes a message list 2142 and a text snapshot 2144 of the message contents of an e-mail message corresponding to the e-mail entry over which a mouse pointer 2141 is hovering. The message list 2142 includes a scroll bar 2146 usable to navigate through message list 2144.

Menu bar 2200A of FIG. 22A is an exemplary menu bar corresponding to a mail user interface window in a horizontally minimized state, and menu bar 2200B of FIG. 22B is an exemplary menu bar corresponding to a mail user interface window in a vertically minimized state. These states corresponds to step 322 of process 300. As the size of the minimal window 2100A, 2100B or 2100C is reduced and its horizontal dimension becomes less than a predetermined value, the display contents of windows 2100A, 2100B or 2100C are replaced in the mail user interface by menu bar 2200A. As shown in FIG. 23A, hovering a mouse pointer 2331 over the menu bar 2200A results in a display 2332 (e.g., a pop-up display) that includes a text snapshot of the message contents of the e-mail last selected in the window when it was in one of its previous states. In another implementation, hovering the mouse pointer 2331 over the menu bar 2200A results in a display 2332 (e.g., a pop-up display) of the complete message contents of the corresponding e-mail.

Alternatively, as the size of a minimal window 2100A, 2100B or 2100C becomes smaller and its vertical dimension becomes less than a predetermined value, the display contents of windows 2100A, 2100B, or 2100C are replaced in the mail user interface by menu bar 2200B. As shown in FIG. 23B, hovering a mouse pointer 2333 over the menu bar 2200B results in a display 2334 (e.g., a pop-up display) that includes a text snapshot of the message contents of the e-mail last selected in the window when it was in one of its previous states. In another implementation, hovering the mouse pointer 2333 over the menu bar 2200B results in a display 2334 (e.g., a pop-up display) of the complete message contents of the corresponding e-mail.

Figure 24:
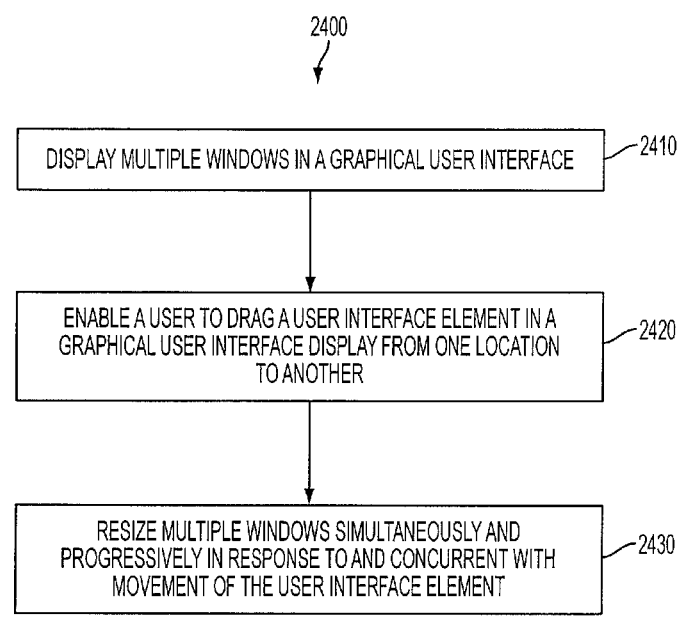
FIG. 24 is a flow chart of an exemplary process by which multiple windows in a graphical user interface are simultaneously resized in response to the user dragging a user interface element.

Process 2400 of FIG. 24 is an exemplary process by which multiple windows in a graphical user interface are simultaneously and progressively resized in response to the user dragging or otherwise repositioning a user interface element in a graphical user interface. A graphical user interface displays multiple windows (2410). A user drags the user interface element across the graphical user interface display from a first location to a second and different location (2420). The multiple windows are simultaneously and progressively resized in response to and concurrent with movement of the user interface element (2430). As the multiple windows are simultaneously resized, each of the windows may transition between different states as described previously, and the display contents of each of the windows may change in accordance with the change in window state.

Figure 25A:
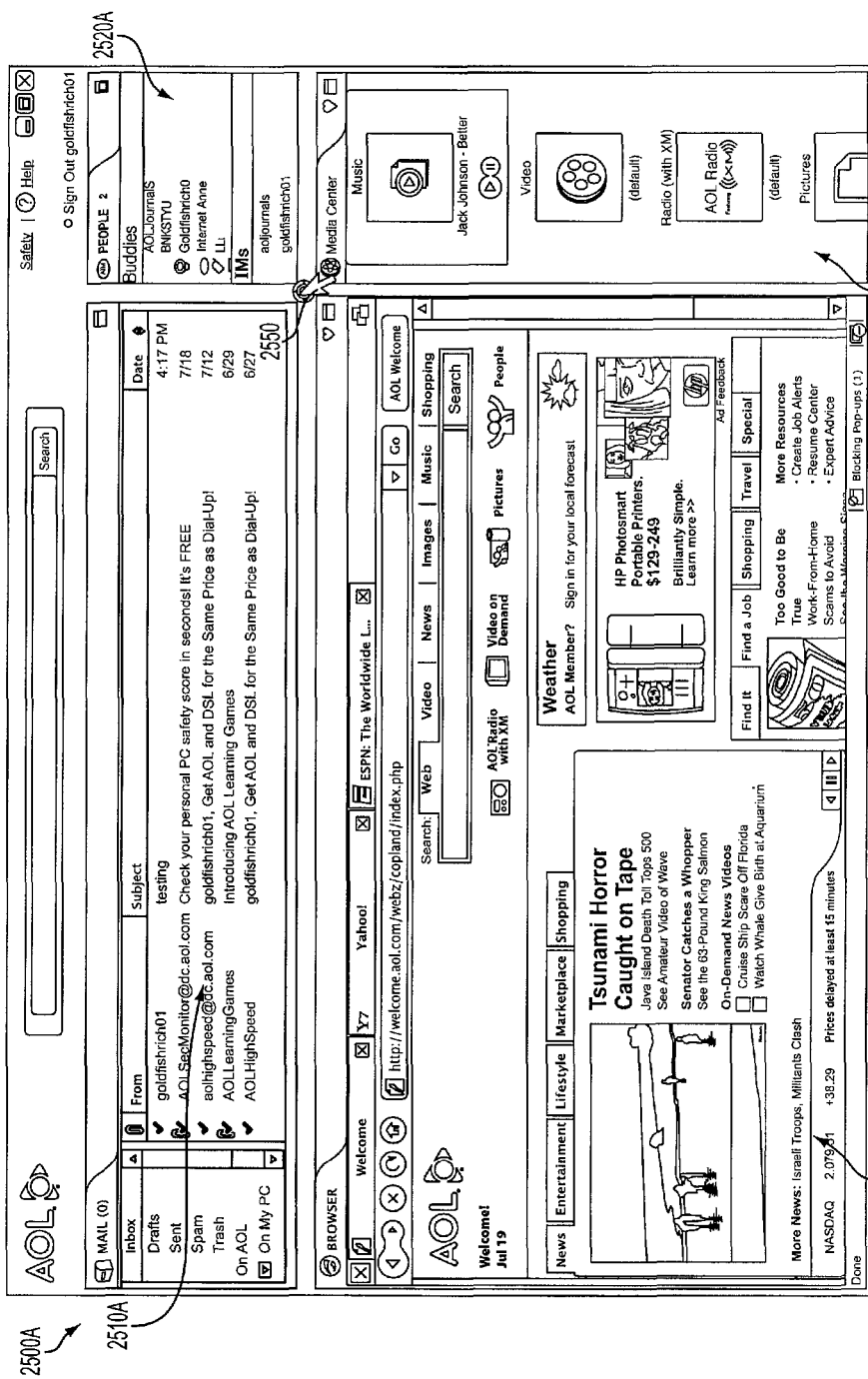
FIGS. 25A-25D are illustrations of a user interface containing four windowpanes that have been simultaneously resized.

FIGS. 25A-25D are illustrations of process 2400 wherein a user interface contains four windowpanes that are simultaneously and progressively resized. For ease of illustration, each of the windowpanes of the user interface reacts to a change in size in accordance with process 300 previously described (i.e., the window panes transition between multiple states, including an active state, a minimal state, and a minimized state). Referring to FIG. 25A, the user interface 2500A shows a windowpane 2530A in an active state and windowpanes 2510A, 2520A, and 2540A in minimal states. In particular, windowpane 2510A is in a vertically minimal state; windowpane 2520A is in a horizontally and vertically minimal state; and windowpane 2540A is in a horizontally minimal state. As the user drags an icon 2550 across the user interface 2500A the size of the four windowpanes 2510A-2540A simultaneously change in response.

In particular, movement of the icon 2550 towards the right (when facing the user interface) increases the horizontal dimension of windowpanes 2510A and 2530A while decreasing the horizontal dimension of windowpanes 2520A and 2540A. Movement of the icon towards left (when facing the user interface) decreases the horizontal dimension of windowpanes 2510A and 2530A while increasing the horizontal dimension of window panes 2520A and 2540A. Similarly, movement of the icon 2550 up (when facing the user interface) increases the vertical dimension of windowpanes 2530A and 2540A while decreasing the vertical dimensions of windowpanes 2510A and 2520A. Movement of the icon 2550 down (when facing the user interface) decreases the vertical dimensions of windowpanes 2530A and 2540A while increasing the vertical dimensions of windowpanes 2510A and 2520A.

Figure 25B:
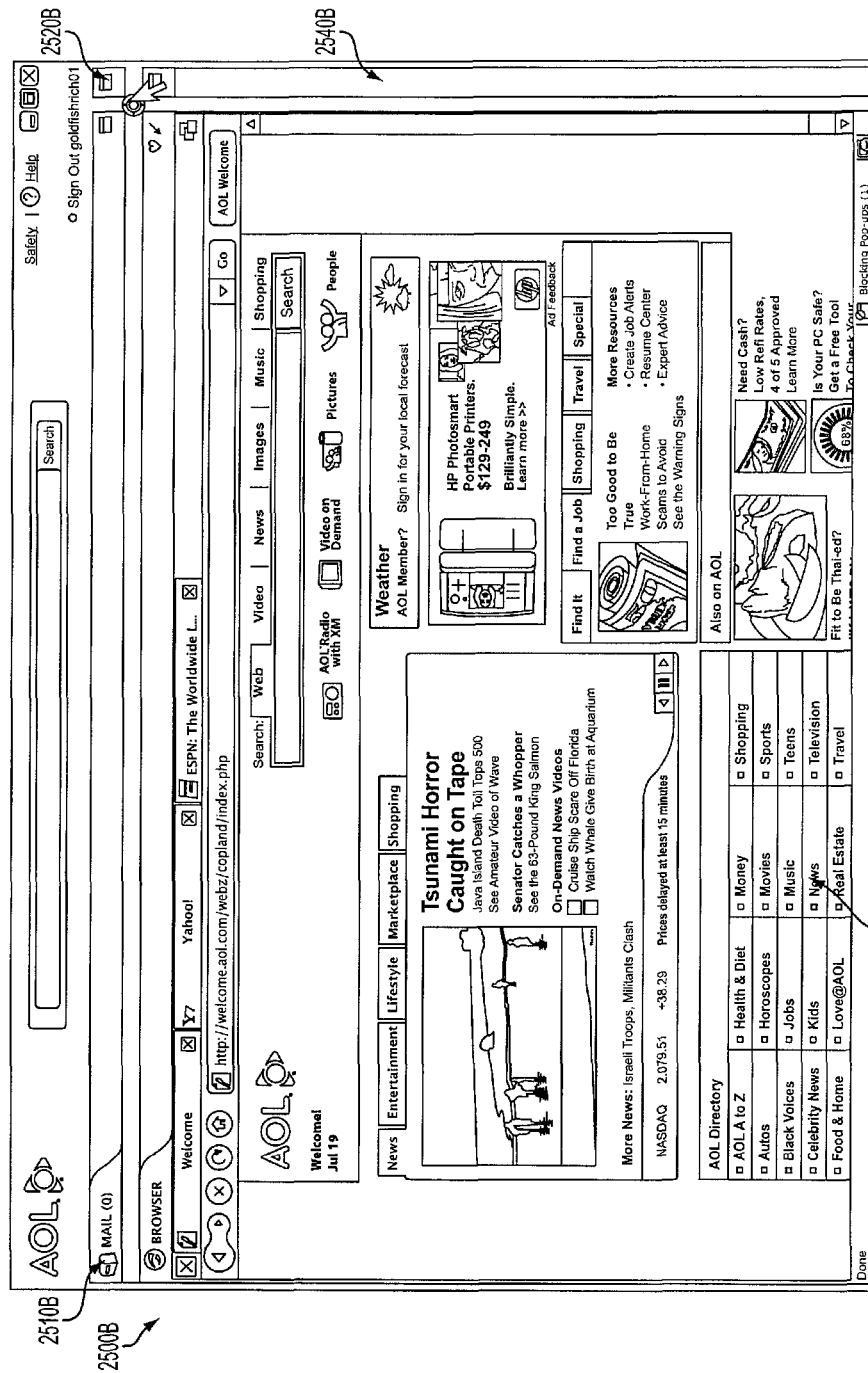

If the user drags the icon 2550 towards the far upper-right corner of the user interface 2500A, the user interface 2500A transforms into a user interface 2500B as shown in FIG. 25B. The user interface 2500B includes windowpanes 2510B-2540B, which correspond to windowpanes 2510A-2540A resized in response to movement of the icon 2550 towards the upper-right corner of the user interface. Notably, the resizing of the windowpanes in response to the movement of the icon 2550 results in some of the windowpanes transitioning into a new window state. In the illustrated example, windowpane 2510A transforms into windowpane 2510B, thereby transitioning from a vertically minimal state to a vertically minimized state. Similarly, windowpane 2540A transforms into windowpane 2540B, thereby transitioning from a horizontally minimal state to a horizontally minimized state. Windowpane 2520A transforms into a button 2520B, thereby transitioning from a horizontally and vertically minimal state to a horizontally and vertically minimized state. The increase in the dimensions of windowpane 2530A transforms the windowpane 2530A into windowpane 2530B, but does not result in a state transition but rather merely results in addition of white space and the updating of scroll bars.

Figure 25C:
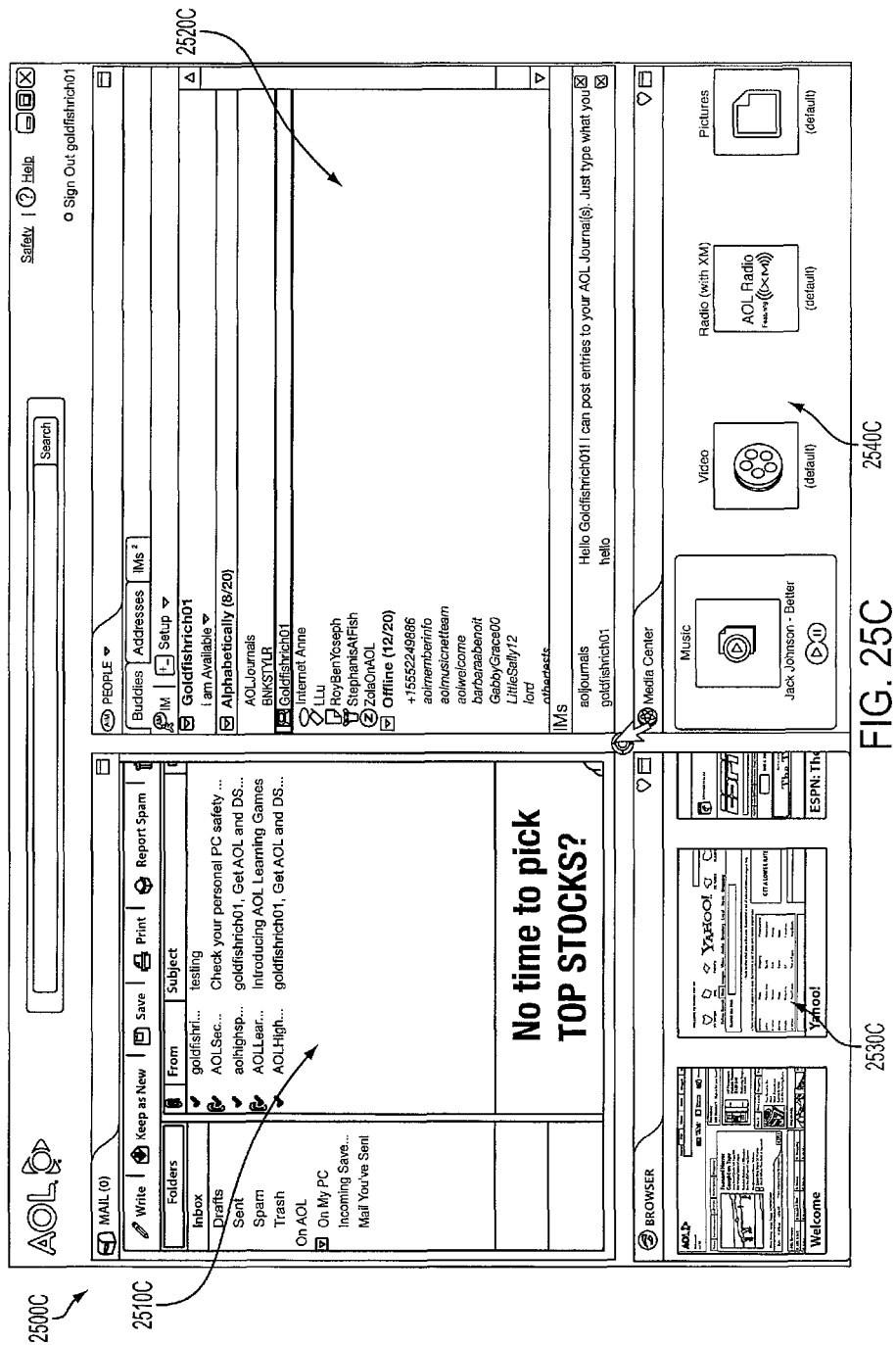

If the user drags the icon 2550 towards the mid lower-left portion the user interface 2500A, the user interface 2500A transforms into a user interface 2500C as shown in FIG. 25C. The user interface 2500C includes windowpanes 2510C-2540C, which correspond to windowpanes 2510A-2540A resized in response to movement of the icon 2550 towards the mid lower-left portion of the user interface. The resizing of the windowpanes in response to the movement of the icon 2550 results in some of the windowpanes transitioning into a new window state. In the illustrated example, windowpane 2510A transforms into windowpane 2510C, thereby transitioning from a vertically minimal state to an active state. Windowpane 2520A transforms into windowpane 2520C, thereby transitioning from a vertically and horizontally minimal state to an active state. Windowpane 2530A transforms into windowpane 2530C, thereby transitioning from an active state to a vertically minimal state, and windowpane 2540A transforms from a horizontally minimal state to a vertically minimal state. In this example, the specific business rules associated with the graphical user interface enables two windows 2510C and 2520C to be in the active state simultaneously.

Figure 25D:
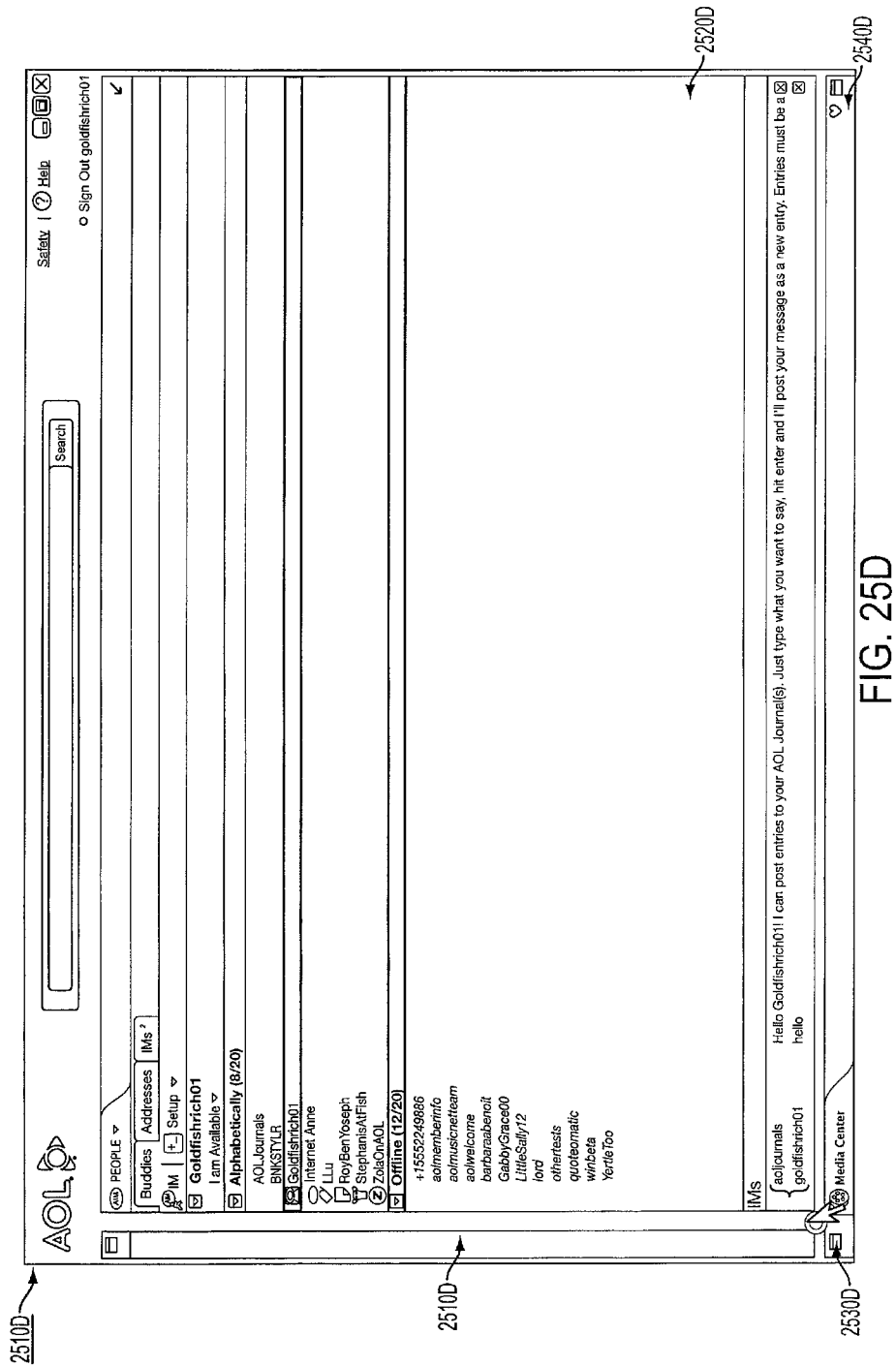

If the user drags the icon 2550 towards the far lower-left corner of the user interface 2500A, the user interface 2500A transforms into a user interface 2500D as shown in FIG. 25D. The user interface 2500D includes windowpanes 2510D-2540D, which correspond to windowpanes 2510A-2540A resized in response to movement of the icon 2550 towards the lower-left corner of the user interface. Notably, the resizing of the windowpanes in response to the movement of the icon 2550 results in some of the windowpanes transitioning into a new window state. In the illustrated example, windowpane 2510A transforms into windowpane 2510D, thereby transitioning from a vertically minimal state to a horizontally minimized state. Similarly, windowpane 2540A transforms into windowpane 2540D, thereby transitioning from a horizontally minimal state to a vertically minimized state. Windowpane 2530A transforms into a button 2530D, thereby transitioning from an active state to a horizontally and vertically minimized state. The increase in the dimensions of windowpane 2520A transforms the windowpane 2520A into windowpane 2520D, thereby transitioning from a horizontally and vertically minimal state to an active state.

Other implementations are within the scope of the following claims.

What is claimed is:

1. A method for replacing display content in a window of a graphical user interface, the method comprising:
displaying a window in a graphical user interface;
displaying first display content in the window;
receiving a request initiated by a user to reduce a size of the window to a first size and then to a second size smaller than the first size;
continuously reducing the size of the window to the first size and then to the second size in response to the request;
adjusting at least one of a scrollbar or white space in the window in order to reduce the size of the window to the first size while still displaying the first display content in the window, wherein the first size is greater than at least one of a predetermined horizontal or vertical threshold amount;
accessing second display content based on the request, the second display content being different from the first display content;
removing the scrollbar from the window and substituting the first display content in the window with the accessed second display content in order to reduce the size of the window from the first size to the second size, wherein the second size is less than the at least one of a predetermined horizontal or vertical threshold.

2. The method of claim 1, wherein:
displaying first display content in the window comprises displaying a web page in the window, and
substituting the second display content for the first display content comprises substituting a thumbnail associated with the web page in place of the web page in the window in response to the request.

3. The method of claim 2, wherein the web page includes text and the thumbnail includes the text in miniaturized form, the text in miniaturized form displayed in the thumbnail being illegible.

4. The method of claim 1, wherein:
displaying first display content in the window comprises displaying a list of received e-mails, a list of e-mail folders, and message contents of a selected e-mail, and
substituting the second display content for the first display content comprises substituting a new list of received e-mails in place of the list of received e-mails, the list of e-mail folders, and the message contents of a selected e-mail in response to the request.

5. The method of claim 4, wherein the list of received e-mails includes a date of receipt of an e-mail and the new list of received e-mails does not include the date of receipt of an e-mail.

6. The method of claim 1, wherein:
displaying first display content in the window comprises displaying a web page, and
substituting the second display content for the first display content comprises substituting a menu bar including an icon corresponding to the web page in place of the web page or a thumbnail associated with the web page in response to the request.

7. The method of claim 6, further comprising presenting a display of the thumbnail associated with the web page in response to the user hovering a pointer over the icon.

8. The method of claim 1, wherein:
displaying first display content in the window comprises displaying a list of media assets including a media asset currently selected by the user for playback, and
substituting the second display content for the first display content comprises replacing the list of media assets with a thumbnail revealing which media asset is currently selected by the user for playback in response to the request.

9. The method of claim 1, wherein:
displaying first display content in the window comprises displaying a first displayable version of a buddy list, and
substituting the second display content for the first display content comprises substituting a second displayable version of the buddy list for the first displayable version of the buddy list in response to the request, the second displayable version of the buddy list being different from the first displayable version of the buddy list.

10. The method of claim 1, further comprising:
determining that the request initiated by the user comprises a request to change the size of the window from a first size having a first horizontal dimension to a second size having a second horizontal dimension, the second horizontal dimension being less than the first horizontal dimension;
comparing the first horizontal dimension to a first predetermined horizontal threshold value; and
comparing the second horizontal dimension to the first predetermined horizontal threshold value,
wherein accessing a second display content based on the request includes accessing a first piece of content as the second display content conditioned on the first horizontal dimension exceeding the first predetermined horizontal threshold value and the second horizontal dimension being less than the first predetermined horizontal threshold value.

11. The method of claim 10, further comprising:
comparing the second horizontal dimension to a second predetermined horizontal threshold value, the second predetermined horizontal threshold value being less than the first predetermined horizontal threshold value,
wherein accessing a second display content based on the request includes accessing a second piece of content as the second display content conditioned on the first horizontal dimension exceeding the first predetermined horizontal threshold value and the second horizontal dimension being less than the second predetermined horizontal threshold value, the second piece of content being different from the first piece of content.

12. The method of claim 1, further comprising:
determining that the request initiated by the user comprises a request to change the size of the window from a first size having a first vertical dimension to a second size having a second vertical dimension, the second vertical dimension being less than the first vertical dimension;
comparing the first vertical dimension to a first predetermined vertical threshold value; and
comparing the second vertical dimension to the first predetermined vertical threshold value,
wherein accessing a second display content based on the request includes accessing a first piece of content as the second display content conditioned on the first vertical dimension exceeding the first predetermined vertical threshold value and the second vertical dimension being less than the first predetermined vertical threshold value.

13. The method of claim 12, further comprising:
comparing the second vertical dimension to a second predetermined vertical threshold value, the second predetermined vertical threshold value being less than the first predetermined vertical threshold value,
wherein accessing a second display content based on the request includes accessing a second piece of content as the second display content conditioned on the first vertical dimension exceeding the first predetermined vertical threshold value and the second vertical dimension being less than the second predetermined vertical threshold value, the second piece of content being different from the first piece of content.

14. The method of claim 1, further comprising:
determining that the request initiated by the user comprises a request to change the size of the window from a first size having a first horizontal dimension and a first vertical dimension to a second size having a second horizontal dimension and a second vertical dimension;
comparing the first horizontal dimension to a first predetermined horizontal threshold value;
comparing the first vertical dimension to a first predetermined vertical threshold value; comparing the second horizontal dimension to the first predetermined horizontal threshold value; and
comparing the second vertical dimension to the first predetermined vertical threshold value,
wherein accessing a second display content based on the request includes accessing a first piece of content as the second display content conditioned on the first horizontal dimension exceeding the first predetermined horizontal threshold value, the first vertical dimension exceeding the first predetermined vertical threshold value, the second horizontal dimension being less than the first predetermined horizontal threshold value, and the second vertical dimension exceeding the first predetermined vertical threshold value.

15. The method of claim 14, further comprising:
comparing the second horizontal dimension to a second predetermined horizontal threshold value, the second predetermined horizontal threshold value being less than the first predetermined horizontal threshold value,
wherein accessing a second display content based on the request includes accessing a second piece of content as the second display content conditioned on the second horizontal dimension being less than the second predetermined horizontal threshold value and the second vertical dimension being greater than the first predetermined vertical threshold value, the second piece of content being different from the first piece of content.

16. The method of claim 1, further comprising:
determining that the request initiated by the user comprises a request to change the size of the window from a first size having a first horizontal dimension and a first vertical dimension to a second size having a second horizontal dimension and a second vertical dimension;
comparing the first horizontal dimension to a first predetermined horizontal threshold value;
comparing the first vertical dimension to a first predetermined vertical threshold value; comparing the second horizontal dimension to the first predetermined horizontal threshold value; and
comparing the second vertical dimension to the first predetermined vertical threshold value,
wherein accessing a second display content based on the request includes accessing a first piece of content as the second display content conditioned on the first horizontal dimension exceeding the first predetermined horizontal threshold value, the first vertical dimension exceeding the first predetermined vertical threshold value, the second horizontal dimension exceeding the first predetermined horizontal threshold value, and the second vertical dimension being less than the first predetermined vertical threshold value.

17. The method of claim 16, further comprising:
comparing the second vertical dimension to a second predetermined vertical threshold value, the second predetermined vertical threshold value being less than the first predetermined vertical threshold value,
wherein accessing a second display content based on the request includes accessing a second piece of content as the second display content conditioned on the second horizontal dimension exceeding the first predetermined horizontal threshold value and the second vertical dimension being less than the second predetermined vertical threshold value, the second piece of content being different from the first piece of content.

18. The method of claim 1, further comprising:
determining that the request initiated by the user comprises a request to change the size of the window from a first size having a first horizontal dimension and a first vertical dimension to a second size having a second horizontal dimension and a second vertical dimension;
comparing the first horizontal dimension to a first predetermined horizontal threshold value;
comparing the first vertical dimension to a first predetermined vertical threshold value; comparing the second horizontal dimension to the first predetermined horizontal threshold value; and
comparing the second vertical dimension to the first predetermined vertical threshold value,
wherein accessing a second display content based on the request includes accessing a first piece of content as the second display content conditioned on the first horizontal dimension exceeding the first predetermined horizontal threshold value, the first vertical dimension exceeding the first predetermined vertical threshold value, the second horizontal dimension being less than the first predetermined horizontal threshold value, and the second vertical dimension being less than the first predetermined vertical threshold value.

19. The method of claim 18, further comprising:
comparing the second horizontal dimension to a second predetermined horizontal threshold value, the second predetermined horizontal threshold value being less than the first predetermined horizontal threshold value,
comparing the second vertical dimension to a second predetermined vertical threshold value, the second predetermined vertical threshold value being less than the first predetermined vertical threshold value,
wherein accessing a second display content based on the request includes accessing a second piece of content as the second display content conditioned on the second horizontal dimension being less than the second predetermined horizontal threshold value and the second vertical dimension being less than the second predetermined vertical threshold value, the second piece of content being different from the first piece of content.

20. The method of claim 1, further comprising:
 determining that the request initiated by the user comprises a request to change the size of the window from a first size having a first horizontal dimension and a first vertical dimension to a second size having a second horizontal dimension and a second vertical dimension;
 comparing the first horizontal dimension to a first predetermined horizontal threshold value;
 comparing the first vertical dimension to a first predetermined vertical threshold value;
 comparing the second horizontal dimension to the first predetermined horizontal threshold value; and
 comparing the second vertical dimension to the first predetermined vertical threshold value,
 wherein accessing a second display content based on the request includes:
  accessing a first piece of content as the second display content conditioned on the first horizontal dimension exceeding the first predetermined horizontal threshold value, the first vertical dimension exceeding the first predetermined vertical threshold value, the second horizontal dimension being less than the first predetermined horizontal threshold value, and the second vertical dimension being greater than the first predetermined vertical threshold value;
  accessing a second piece of content as the second display content conditioned on the first horizontal dimension exceeding the first predetermined horizontal threshold value, the first vertical dimension exceeding the first predetermined vertical threshold value, the second horizontal dimension being greater than the first predetermined horizontal threshold value, and the second vertical dimension being less than the first predetermined vertical threshold value; and
  accessing a third piece of content as the second display content conditioned on the first horizontal dimension exceeding the first predetermined horizontal threshold value, the first vertical dimension exceeding the first predetermined vertical threshold value, the second horizontal dimension being less than the first predetermined horizontal threshold value, and the second vertical dimension being less than the first predetermined vertical threshold value,
  wherein the first piece of content, the second piece of content, and the third piece of content are different from each other.

21. The method of claim 1, wherein the scrollbars are structured and arranged to enable a user to scroll through the first display content by interacting with the scrollbars.

22. The method of claim 21, wherein the first display content is a web page and the scrollbars are configured to be manipulable by a user to scroll through the web page.

23. A method for replacing display content in a window of a graphical user interface, the method comprising:
 displaying a window that includes scrollbars in a graphical user interface; displaying first display content in the window;
 receiving a request initiated by a user to decrease a size of the window from a first size to a second and smaller size, the first size having an initial dimension and the second size having a final dimension corresponding to the initial dimension reduced in size;
 accessing a first predetermined threshold value;
 determining whether the final dimension is greater than the first predetermined threshold value;
 if the final dimension is determined to be greater than the first predetermined threshold value, resizing the window and updating the scrollbars of the window to accommodate the first display content in the resized window in response to the request; and
 if the final dimension is determined to be less than the first predetermined threshold value:
  accessing second display content based on the request, the second display content being different from the first display content; and
  in response to the request, resizing the window, removing the scrollbars from the window, and substituting the second display content for the first display content in the resized window.

24. A method for replacing display content in a window of a graphical user interface, the method comprising:
 displaying a window in a graphical user interface;
 displaying a web page in the window;
 receiving a request initiated by a user to decrease a size of the window to a first size and then to a second size smaller than the first size;
 continuously reducing the size of the window to the first size and then to the second size in response to the request;
 adjusting at least one of a scrollbar and white space in the window in order to reduce the size of the window to the first size while still displaying the web page in the window;
 accessing a thumbnail of the web page-based on the request; and
 removing the scrollbar from the window and substituting the web page in the window with the thumbnail in order to reduce the size of the window from the first size to the second size.

25. The method of claim 24, wherein the web page includes text and the thumbnail includes the text in miniaturized form, the text in miniaturized form displayed in the thumbnail being illegible.

26. A method for replacing display content in a window of a graphical user interface, the method comprising:
 displaying a window that includes scrollbars in a graphical user interface;
 displaying a web page in the window;
 receiving a request initiated by a user to decrease a size of the window from an initial size to a final and smaller size;
 accessing a first predetermined threshold value;
 determining whether the final size has a first dimension that is less than the first predetermined threshold value;
 if the first dimension is not determined to be less than the first predetermined threshold value, updating the scrollbars of the window to accommodate the web page in the resized window in response to the request; and
 if the first dimension is determined to be less than the first predetermined threshold value:
  accessing a thumbnail of the web page; and
  in response to the request, resizing the window and substituting the thumbnail of the web page for the web page in the resized window.

27. The method of claim 26, wherein the web page includes text and the thumbnail includes the text in miniaturized form, the text in miniaturized form displayed in the thumbnail being illegible.

28. A method for replacing display content in a window of a graphical user interface, the method comprising:
 displaying a window in a graphical user interface;
 displaying first display content in the window;

receiving a request initiated by a user to change a size of the window;

accessing second display content based on the request, the second display content being different from the first display content; and in response to the request, resizing the window and substituting the second display content for the first display content in the resized window, wherein displaying first display content in the window comprises displaying a list of received e-mails, a list of e-mail folders, and message contents of a selected e-mail, and wherein substituting the second display content for the first display content comprises substituting a new list of received e-mails in place of the list of received e-mails, the list of e-mail folders, and the message contents of a selected e-mail in response to the request, the request being a request to decrease the size of the window.

29. A method for replacing display content in a window of a graphical user interface, the method comprising:

displaying a window in a graphical user interface;
displaying first display content in the window;
receiving a request initiated by a user to change a size of the window;
accessing second display content based on the request, the second display content being different from the first display content; and
in response to the request, resizing the window and substituting the second display content for the first display content in the resized window,
wherein displaying first display content in the window comprises displaying a list of media assets including a media asset currently selected by the user for playback, and
wherein substituting the second display content for the first display content comprises replacing the list of media assets with a thumbnail revealing which media asset is currently selected by the user for playback in response to the request, the request being a request to decrease the size of the window.

30. A method for replacing display content in a window of a graphical user interface, the method comprising:

displaying a window in a graphical user interface;
displaying first display content in the window;
receiving a request initiated by a user to change a size of the window;
accessing second display content based on the request, the second display content being different from the first display content; and
in response to the request, automatically resizing the window and substituting the second display content for the first display content in the resized window,
wherein displaying first display content in the window comprises displaying a first displayable version of a buddy list, and
wherein substituting the second display content for the first display content comprises substituting a second displayable version of the buddy list for the first displayable version of the buddy list in response to the request,
wherein one of the second displayable version and the first displayable version display a list of offline buddies while the other of the second displayable version and the first displayable version does not display the list of the offline buddies.

31. The method of claim 30, wherein:
the second display content further includes a list of the last instant message sent by the user in each of at least one instant messaging session, and
the request comprises a request to increase the size of the window.

32. The method of claim 30, wherein:
the second displayable version of the buddy list is identical to the first displayable version of the buddy list except that the second displayable version of the buddy list does not include identifiers for buddies that are offline, and
the request comprises a request to decrease the size of the window.

33. A method for replacing display content in a window of a graphical user interface, the method comprising:

displaying a window in a graphical user interface;
displaying first display content in the window;
receiving a request initiated by a user to change a size of the window;
accessing second display content based on the request, the second display content being different from the first display content; and
in response to the request, resizing the window and substituting the second display content for the first display content in the resized window,
wherein displaying first display content in the window comprises displaying web content, and
substituting the second display content for the first display content comprises substituting a menu bar including an icon corresponding to the web content in place of the web content in response to the request.

34. The method of claim 33, further comprising:
presenting a display of the web content in response to a user hovering a pointer over the icon in the window displaying the second display content.

* * * * *

UNITED STATES PATENT AND TRADEMARK OFFICE
CERTIFICATE OF CORRECTION

| | | |
|---|---|---|
| PATENT NO. | : 8,464,177 B2 | Page 1 of 1 |
| APPLICATION NO. | : 11/747819 | |
| DATED | : June 11, 2013 | |
| INVENTOR(S) | : Roy Ben-Yoseph et al. | |

It is certified that error appears in the above-identified patent and that said Letters Patent is hereby corrected as shown below:

Title page, please add: -- (73) Assignee: AOL Inc., Dulles, VA (US) --

Signed and Sealed this
Twenty-ninth Day of October, 2013

Teresa Stanek Rea
*Deputy Director of the United States Patent and Trademark Office*